(12) United States Patent　　　　(10) Patent No.:　US 12,582,046 B2
Wigdahl et al.　　　　　　　　　　　(45) Date of Patent:　Mar. 24, 2026

(54) NIP SYSTEM IN A MODULE WRAP FEED ARRANGEMENT

(71) Applicant: Deere & Company, Moline, IL (US)

(72) Inventors: Jeffrey S. Wigdahl, Ames, IA (US);
Ryan A. Hackert, Polk City, IA (US);
Jeffrey R. Fox, Minburn, IA (US)

(73) Assignee: Deere & Company, Moline, IL (US)

( * ) Notice: Subject to any disclaimer, the term of this patent is extended or adjusted under 35 U.S.C. 154(b) by 36 days.

(21) Appl. No.: 18/745,267

(22) Filed: Jun. 17, 2024

(65) Prior Publication Data

US 2025/0031628 A1　　Jan. 30, 2025

Related U.S. Application Data

(60) Provisional application No. 63/516,281, filed on Jul. 28, 2023.

(51) Int. Cl.
*A01F 15/07*　　　(2006.01)
*A01F 15/08*　　　(2006.01)
*B65B 11/02*　　　(2006.01)
*B65H 20/02*　　　(2006.01)
(52) U.S. Cl.
CPC ........ *A01F 15/0715* (2013.01); *A01F 15/071* (2013.01); *B65B 11/025* (2013.01); *B65H 20/02* (2013.01); *A01F 15/08* (2013.01)
(58) Field of Classification Search
CPC .... A01F 15/07; A01F 15/071; A01F 15/0715; A01F 15/08; B65H 20/02; B65B 11/025
USPC .......... 57/210, 211, 389.2, 389.4, 389.5, 587
See application file for complete search history.

(56) References Cited

U.S. PATENT DOCUMENTS

| | | | | | |
|---|---|---|---|---|---|
| 3,271,025 A | * | 9/1966 | Rosenburgh | ............. | D06C 3/00 271/225 |
| 3,869,849 A | * | 3/1975 | Ulrich | .................... | A01D 39/00 56/343 |
| 3,985,277 A | * | 10/1976 | Wright | ................... | B65H 20/02 226/177 |
| 4,053,092 A | * | 10/1977 | Edwards | ................ | B65H 20/04 226/90 |

(Continued)

FOREIGN PATENT DOCUMENTS

| | | | | | |
|---|---|---|---|---|---|
| GB | | 2153294 A | * | 8/1985 | ............. A01F 15/07 |
| JP | | H10147467 | * | 6/1998 | ............. B65H 20/02 |

*Primary Examiner* — Shelley M Self
*Assistant Examiner* — Eduardo R Ferrero
(74) *Attorney, Agent, or Firm* — Tucker Ellis LLP

(57)　　　　　　　ABSTRACT

A nip system is provided for use with an associated wrap floor assembly that is movable between lowered and raised positions relative to a chassis supporting a module builder of an associated harvester. Wrap frame roller members are connected with a frame structure of the associated wrap floor assembly, wherein the wrap frame roller members are movable together with the associated wrap floor assembly between the lowered and raised positions relative to the chassis of the associated harvester. Chassis roller members are provided that are biased relative to the chassis of the associated harvester towards the associated wrap floor assembly. A method of retrofitting a nip system provides a persistent nonhomogeneous nip system in an associated wrap floor assembly that is movable between lowered and raised positions relative to a chassis supporting a module builder of an associated harvester.

20 Claims, 16 Drawing Sheets

(56) References Cited

U.S. PATENT DOCUMENTS

| | | | | |
|---|---|---|---|---|
| 4,057,185 A | * | 11/1977 | Slama | B65H 20/02 |
| | | | | 226/42 |
| 4,366,665 A | * | 1/1983 | VanGinhoven | A01F 15/0715 |
| | | | | 100/88 |
| 4,597,516 A | * | 7/1986 | Mayhall, Jr. | B65B 61/00 |
| | | | | 226/181 |
| 4,779,526 A | * | 10/1988 | Frerich | A01F 15/0715 |
| | | | | 53/118 |
| 4,790,125 A | * | 12/1988 | Merritt, III | A01F 15/0715 |
| | | | | 53/118 |
| 4,813,348 A | * | 3/1989 | Frerich | A01F 15/0715 |
| | | | | 100/88 |
| 4,995,216 A | * | 2/1991 | Vansteelant | A01F 15/0715 |
| | | | | 53/118 |
| 5,129,207 A | * | 7/1992 | Butler | A01F 15/0715 |
| | | | | 53/118 |
| 5,129,208 A | * | 7/1992 | Van Zee | A01F 15/0715 |
| | | | | 53/118 |
| 5,181,368 A | * | 1/1993 | Anstey | A01F 15/0715 |
| | | | | 53/118 |
| 5,193,728 A | * | 3/1993 | Pieroni | A41H 43/005 |
| | | | | 226/186 |
| 5,216,873 A | * | 6/1993 | Ratzlaff | B65B 11/04 |
| | | | | 53/118 |
| 5,326,011 A | * | 7/1994 | Mager | B65H 20/02 |
| | | | | 400/636 |
| 5,729,953 A | * | 3/1998 | Fell | A01F 15/0715 |
| | | | | 53/118 |
| 5,915,644 A | * | 6/1999 | Prittie | B65H 20/02 |
| | | | | 242/525.4 |
| 6,006,504 A | * | 12/1999 | Myers | A01F 15/0715 |
| | | | | 53/556 |
| 6,050,052 A | * | 4/2000 | Herron | A01F 15/0715 |
| | | | | 53/118 |
| 10,279,940 B2 | | 5/2019 | Weber et al. | |
| 10,609,868 B2 | | 4/2020 | Hummel et al. | |
| 10,881,049 B2 | | 1/2021 | Gresset et al. | |
| 10,912,257 B2 | | 2/2021 | Jacobson et al. | |
| 10,980,182 B2 | | 4/2021 | Hackert et al. | |
| 11,363,759 B2 | | 6/2022 | Dutertre et al. | |
| 11,375,669 B2 | | 7/2022 | Hackert et al. | |
| 2005/0127600 A1 | * | 6/2005 | Wood | B65H 5/062 |
| | | | | 271/273 |
| 2015/0373917 A1 | * | 12/2015 | Reijersen Van Buuren | A01F 15/0715 |
| | | | | 53/529 |
| 2016/0353664 A1 | * | 12/2016 | Weber | A01F 15/18 |
| 2016/0355292 A1 | | 12/2016 | Wigdahl et al. | |
| 2017/0057680 A1 | * | 3/2017 | Schlichting | G06K 7/10425 |
| 2021/0022295 A1 | * | 1/2021 | Simmons | A01F 15/071 |

* cited by examiner

424

550

520

NIP SYSTEM IN A MODULE WRAP FEED ARRANGEMENT

RELATED APPLICATION

This application claims the benefit of U.S. Provisional Patent Application Ser. No. 63/516,281, filed Jul. 28, 2023.

FIELD OF THE DISCLOSURE

The present disclosure generally relates to crop baling systems and crop baling methods and, in particular, to nip systems and methods for assisting delivery of an outer covering onto bales of agricultural products. Although the implementations herein will be described in connection with nonhomogeneous nip systems and methods assisting delivery of sheets of wrap material onto cotton crops formed in round cotton modules, and also in connection with persistent nonhomogeneous nip systems and methods assisting delivery of sheets of wrap material onto cotton crops formed in round cotton modules, and further also to methods of retrofitting existing equipment to include such systems and to perform such methods, it is to be appreciated that the implementations have broader application including for example to such systems and methods assisting delivery of covering materials for bundling or otherwise wrapping other items or products and other agricultural crop products such as hay, straw, and the like.

BACKGROUND

Round module builders or balers use belts and rollers to manipulate harvested material into a desired form typically in a module forming chamber. Round hay balers and round module builders for cotton both typically use belts extending in parallel under tension running on a series of rollers to compact the harvested material into a cylindrical shape. The belts travel along the rollers to generate a forming chamber wherein the harvested material is collected and formed into the desired shape and density. Once the harvested material is formed to the desired size, a wrap delivery system then delivers a protective and supportive wrap material into the forming chamber to wrap the module with the wrap material prior to ejecting the module from the forming chamber.

The wrap material is typically distributed to the module forming chamber by the wrap delivery system from a supply roll positioned upstream of the wrap delivery system. The supply roll is positioned on support rollers and the wrap material is fed by selectively driven wrap feed belts to ultimately enter the module forming chamber via the wrap delivery system. Often, wrap delivery rollers are biased against the selectively driven wrap feed belt to cooperatively with the belt pinch the wrap material therebetween. The wrap feed belts are typically powered by a mechanical connection with the rollers and/or the driven belts of the module builder, and typically move at a speed that is slightly less than the speed of the belts and/or rollers of the module builder resulting in a nominal stretching of the wrap material as it is wrapped onto the harvested material. Plastic wrap material having desired elastic properties has been found to be particularly well suited for this application. In addition to the above, the wrap material may be conveyed toward a pinch location at the module forming chamber using selectively energized wrap floor belts of a correspondingly selectively movable wrap floor assembly.

In the case of pre-partitioned lengths of wrap material, it is possible that adjacent segments of the wrap material may be interleaved together at a lapped joint, which may be connected together by a perforation and/or an adhesive permitting separation of the joint without requiring a cutting mechanism upon the application of a predetermined tensile force. Rather, all that is required is to apply a tensile force necessary for separating the material at the joint such as for example by applying such a force in a length portion of the wrap material extending generally between the supply roll and a pinch location formed between the rotating module and module-forming belts of a wrap chamber.

Sometimes, however, the wrap material can be misfed due to misalignment, deformation, wear occurring to the parts located anywhere along the material feed path, and for many other reasons including for example weather conditions that may affect undesirable changes in the material properties of the wrap material or that may affect undesirable movement of the wrap material in the feed system.

In order to help retain the wrap material during use of the system in adverse weather conditions and in particular during windy conditions, for example, so as to help prevent misfeeds, one or more delivery assist nips have been provided. These consist essentially of one or more rotatable pinch rollers carried relative to the frame or chassis of the harvester on arms of a pivotal support assembly, wherein the one or more delivery assist nips are created between the one or more pinch rollers and the wrap floor belts. The pivotal support assembly includes a spring or the like to bias the pivotal support assembly for urging the one or more pinch rollers carried on the arms generally away from the frame or chassis of the harvester and into engagement with the wrap floor belts. In that way, one or more persistent nips are created between the pinch rollers and the wrap floor belts regardless of whether the movable wrap floor assembly is disposed in a raised or engaged conformation relative to portions of the module forming chamber or in a lowered or disengaged conformation relative to portions of the module forming chamber. The persistent nips are homogeneous in that they are formed by the same set of one or more pinch rollers and the wrap floor belts regardless of whether the movable wrap floor assembly is disposed in the raised or lowered conformation relative to portions of the module forming chamber.

The use of the one or more delivery assist nips as described above has been successful in helping to minimize misfeeds of the wrap material. However, conditions may still arise that may lead to a disruption of delivery of the wrap material to the module forming chamber such as for example by wind gusts that effect a backwards feeding or withdrawal of the wrap material from the nips.

In addition to the above, some misfeeds may occur because of an early separation at the lapped joint of the pre-partitioned lengths of wrap material. The early separation may be attributable to differing properties of wrap material sourced from different vendors.

Since the misfeeding of the wrap may result in an improperly wrapped bale, service to the machine is typically required to correct the underlying problem(s). This is time consuming and therefore costly.

Methods and systems are therefore needed to help reduce or eliminate wrap material feeding problems.

SUMMARY

In accordance with an aspect herein, a nonhomogeneous nip system is provided for use with an associated wrap floor assembly that is movable between lowered and raised positions relative to a chassis supporting a module builder of an associated harvester. The nonhomogeneous nip system includes a plurality of wrap frame roller members connected with a frame structure of the associated wrap floor assembly wherein the plurality of wrap frame roller members are movable together with the associated wrap floor assembly between the lowered and raised positions relative to the chassis of the associated harvester, and a plurality of chassis roller members biased relative to the chassis of the associated harvester towards the associated wrap floor assembly. The plurality of wrap frame roller members are connected with the frame structure at a position relative to the plurality of chassis roller members causing nonhomogeneous nips to be formed. A first one or more nips of the nonhomogeneous nips are formed between the plurality of chassis roller members and the plurality of wrap frame roller members for the associated wrap floor assembly being disposed in the lowered position relative to the chassis. A second one or more nips of the nonhomogeneous nips are formed between the plurality of chassis roller members and associated wrap floor belts of the associated wrap floor assembly for the associated wrap floor assembly being disposed in the raised position relative to the chassis.

In accordance with an aspect herein, a persistent nonhomogeneous nip system is provided for use with an associated wrap floor assembly that is movable between lowered and raised positions relative to a chassis supporting a module builder of an associated harvester. The persistent nip system includes a plurality of wrap frame roller members connected with a frame structure of the associated wrap floor assembly wherein the plurality of wrap frame roller members are movable together with the associated wrap floor assembly between the lowered and raised positions relative to the chassis of the associated harvester, and a plurality of chassis roller members biased relative to the chassis of the associated harvester towards the associated wrap floor assembly. The plurality of wrap frame roller members are connected with the frame structure at a position relative to the plurality of chassis roller members causing persistent nonhomogeneous nips to be formed. A first one or more persistent nips of the persistent nonhomogeneous nips are formed between the plurality of chassis roller members and the plurality of wrap frame roller members for the associated wrap floor assembly being disposed in the lowered position relative to the chassis. A second one or more persistent nips of the persistent nonhomogeneous nips are formed between the plurality of chassis roller members and associated wrap floor belts of the associated wrap floor assembly for the associated wrap floor assembly being disposed in the raised position relative to the chassis. A third one or more persistent nips of the persistent nonhomogeneous nips are formed between the plurality of chassis roller members and a combination of the plurality of wrap frame roller members and the associated wrap floor belts for the associated wrap floor assembly being disposed at a transition conformation between the lowered and raised positions relative to the chassis of the associated harvester.

In accordance with a further aspect herein, a method of retrofitting a nip system provides a nonhomogeneous nip system in an associated wrap floor assembly that is movable between lowered and raised positions relative to a chassis supporting a module builder of an associated harvester. The method includes providing a plurality of wrap frame roller members, and connecting the plurality of wrap frame roller members with a frame structure of the associated wrap floor assembly wherein the plurality of wrap frame roller members are movable together with the associated wrap floor assembly between the lowered and raised positions relative to the chassis of the associated harvester. The plurality of wrap frame roller members are connected with the frame structure at a position relative to a plurality of chassis roller members biased relative to the chassis of the associated harvester towards the associated wrap floor assembly to cause nonhomogeneous nips to thereby be formed between the plurality of chassis roller members and the plurality of wrap frame roller members for the associated wrap floor assembly being disposed in the lowered position relative to the chassis, between the plurality of chassis roller members and associated wrap floor belts of the associated wrap floor assembly for the associated wrap floor assembly being disposed in the raised position relative to the chassis, and between the plurality of chassis roller members and a combination of the plurality of wrap frame roller members and the associated wrap floor belts for the associated wrap floor assembly being disposed at a transition conformation between the lowered and raised positions relative to the chassis of the associated harvester.

In accordance with a further aspect herein, a method of retrofitting a nip system provides a persistent nonhomogeneous nip system in an associated wrap floor assembly that is movable between lowered and raised positions relative to a chassis supporting a module builder of an associated harvester. The method includes providing a plurality of wrap frame roller members, and connecting the plurality of wrap frame roller members with a frame structure of the associated wrap floor assembly wherein the plurality of wrap frame roller members are movable together with the associated wrap floor assembly between the lowered and raised positions relative to the chassis of the associated harvester. The plurality of wrap frame roller members are connected with the frame structure at a position relative to a plurality of chassis roller members biased relative to the chassis of the associated harvester towards the associated wrap floor assembly to cause persistent nonhomogeneous nips to thereby be formed: between the plurality of chassis roller members and the plurality of wrap frame roller members for the associated wrap floor assembly being disposed in the lowered position relative to the chassis, between the plurality of chassis roller members and associated wrap floor belts of the associated wrap floor assembly for the associated wrap floor assembly being disposed in the raised position relative to the chassis, and between the plurality of chassis roller members and a combination of the plurality of wrap frame roller members and the associated wrap floor belts for the associated wrap floor assembly being disposed at a transition conformation between the lowered and raised positions relative to the chassis of the associated harvester.

In accordance with an aspect herein, a nip system is provided for use with an associated wrap floor assembly that is movable between lowered and raised positions relative to a chassis supporting a module builder of an associated harvester. The nip system includes a plurality of wrap frame roller members connected with a frame structure of the associated wrap floor assembly, and a plurality of chassis roller members biased relative to the chassis of the associated harvester towards the associated wrap floor assembly. The plurality of wrap frame roller members are movable together with the associated wrap floor assembly between the lowered and raised positions relative to the chassis of the associated harvester. The plurality of wrap frame roller members are connected with the frame structure at a position relative to the plurality of chassis roller members causing a nip to be formed between the plurality of chassis roller members and the plurality of wrap frame roller members for the associated wrap floor assembly being disposed in the lowered position relative to the chassis.

In any of the implementations herein, the plurality of wrap frame roller members are connected with the frame structure at a position relative to the plurality of chassis roller members causing nonhomogeneous nips to be formed between the plurality of chassis roller members and the plurality of wrap frame roller members for the associated wrap floor assembly being disposed in the lowered position relative to the chassis, and between the plurality of chassis roller members and associated wrap floor belts of the associated wrap floor assembly for the associated wrap floor assembly being disposed in the raised position relative to the chassis.

In any of the implementations herein, the plurality of wrap frame roller members are connected with the frame structure at a position relative to the plurality of chassis roller members causing a persistent nip to be formed between the plurality of chassis roller members and a combination of the plurality of wrap frame roller members and associated wrap floor belts of the associated wrap floor assembly for the associated wrap floor assembly being disposed at a transition conformation between the lowered and raised positions relative to the chassis of the associated harvester.

In any of the implementations herein, the plurality of wrap frame roller members are unidirectionally rotatably connected with the frame structure of the associated wrap floor assembly.

In accordance with an aspect herein, a persistent nonhomogeneous nip system is provided for use with an associated wrap floor assembly that is movable between lowered and raised positions relative to a chassis supporting a module builder of an associated harvester. The nip system includes a plurality of wrap frame roller members connected with a frame structure of the associated wrap floor assembly, and a plurality of chassis roller members biased relative to the chassis of the associated harvester towards the associated wrap floor assembly. The plurality of wrap frame roller members are movable together with the associated wrap floor assembly between the lowered and raised positions relative to the chassis of the associated harvester. The plurality of wrap frame roller members are connected with the frame structure at a position relative to the plurality of chassis roller members causing persistent nonhomogeneous nips to be formed between the plurality of chassis roller members and the plurality of wrap frame roller members for the associated wrap floor assembly being disposed in the lowered position relative to the chassis, between the plurality of chassis roller members and associated wrap floor belts of the associated wrap floor assembly for the associated wrap floor assembly being disposed in the raised position relative to the chassis, and between the plurality of chassis roller members and a combination of the plurality of wrap frame roller members and the associated wrap floor belts for the associated wrap floor assembly being disposed at a transition conformation between the lowered and raised positions relative to the chassis of the associated harvester.

In accordance with an aspect herein, a method is provided for retrofitting an associated harvester having wrap floor assembly that is movable between lowered and raised positions relative to a chassis supporting a module builder to provide a nip system in the associated harvester. The retrofitting method includes providing a plurality of wrap frame roller members, and connecting the plurality of wrap frame roller members with a frame structure of the associated wrap floor assembly to be movable together with the associated wrap floor assembly and at a position relative to a plurality of chassis roller members biased relative to the chassis of the associated harvester towards the associated wrap floor assembly to cause a nip to thereby be formed between the plurality of chassis roller members and the plurality of wrap frame roller members for the associated wrap floor assembly being disposed in the lowered position relative to the chassis.

In any of the retrofitting implementations herein, the providing the nip includes providing a non-homogeneous nip system in the associated harvester by connecting the plurality of wrap frame roller members with the frame structure of the associated wrap floor assembly to be movable together with the associated wrap floor assembly and at a position relative to a plurality of chassis roller members biased relative to the chassis of the associated harvester towards the associated wrap floor assembly to cause a non-homogeneous nip to thereby be formed between the plurality of chassis roller members and the plurality of wrap frame roller members for the associated wrap floor assembly being disposed in the lowered position relative to the chassis, and between the plurality of chassis roller members and associated wrap floor belts of the associated wrap floor assembly for the associated wrap floor assembly being disposed in the raised position relative to the chassis.

In any of the retrofitting implementations herein, the providing the nip includes providing a persistent non-homogeneous nip system in the associated harvester by connecting the plurality of wrap frame roller members with the frame structure of the associated wrap floor assembly to be movable together with the associated wrap floor assembly and at a position relative to a plurality of chassis roller members biased relative to the chassis of the associated harvester towards the associated wrap floor assembly to cause a non-homogeneous nip to thereby be formed between the plurality of chassis roller members and the plurality of wrap frame roller members for the associated wrap floor assembly being disposed in the lowered position relative to the chassis, between the plurality of chassis roller members and associated wrap floor belts of the associated wrap floor assembly for the associated wrap floor assembly being disposed in the raised position relative to the chassis, and between the plurality of chassis roller members and a combination of the plurality of wrap frame roller members and the associated wrap floor belts for the associated wrap floor assembly being disposed at a transition conformation between the lowered and raised positions relative to the chassis of the associated harvester.

In any of the retrofitting implementations herein, the providing the plurality of wrap frame roller members includes providing a plurality of unidirectionally rotatably wrap frame roller members, and connecting the plurality of unidirectionally rotatably wrap frame roller members with the frame structure of the associated wrap floor assembly.

BRIEF DESCRIPTION OF THE DRAWINGS

The above-mentioned aspects of the present disclosure and the manner of obtaining them will become more apparent and the disclosure itself will be better understood by reference to the following description of the implementations of the disclosure, taken in conjunction with the accompanying drawings, wherein.

DETAILED DESCRIPTION

Figure 1:
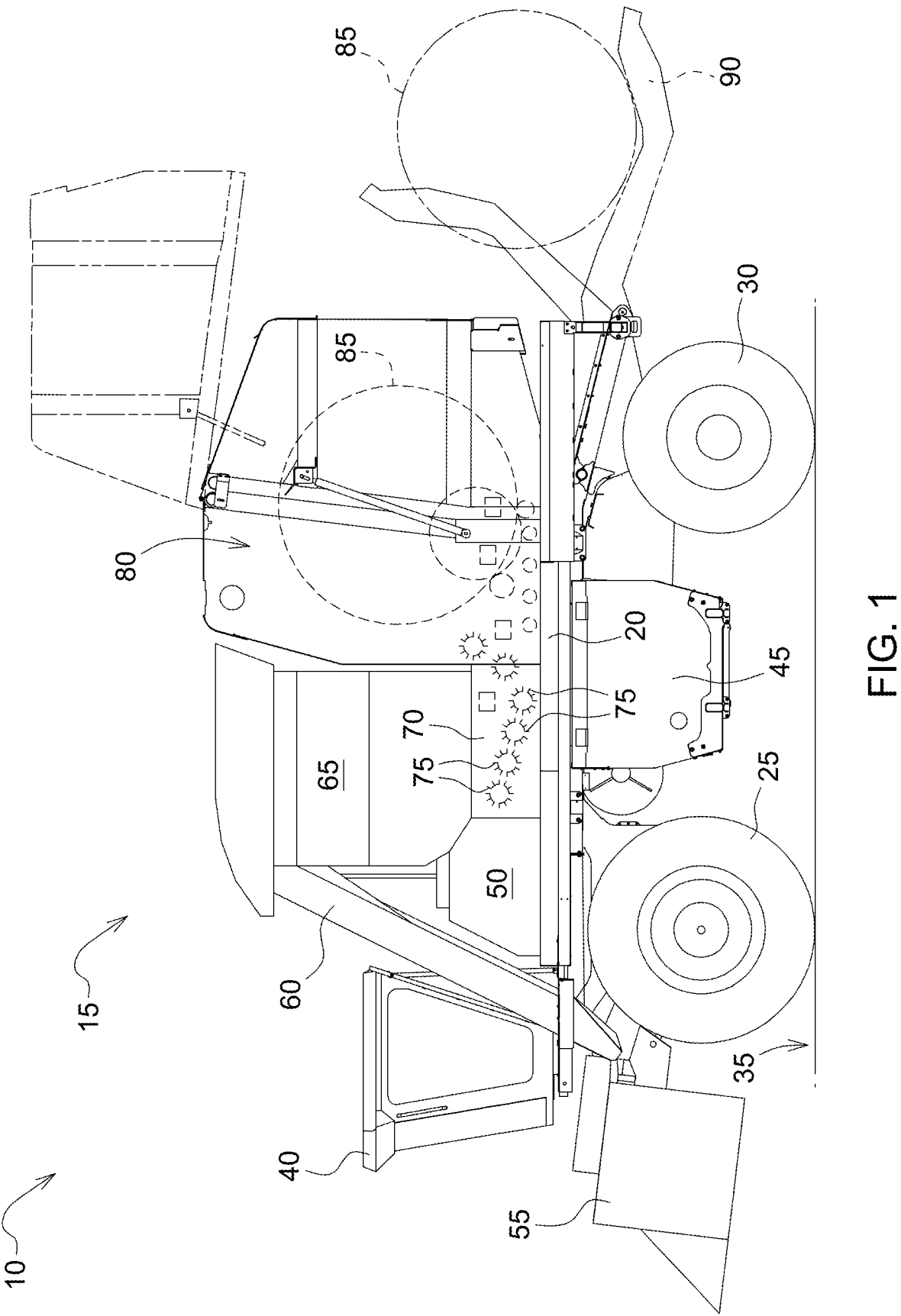
FIG. 1 is a side view of a cotton harvester.

The claimed subject matter is now described with reference to the drawings, wherein like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details.

FIG. 1 illustrates a conventional harvester 10 according to an implementation. The illustrated harvester 10 is a cotton harvester 15. Alternatively, the harvester 10 may be any type of work machine that utilizes a wrapping assembly.

The harvester 10 includes a chassis 20. The chassis 20 is supported by front wheels 25 and rear wheels 30. The harvester 10 is adapted for movement through a field 35 to harvest cotton or other crops. An operator station 40 is supported by the chassis 20. A power module 45 may be supported below the chassis 20. Water, lubricant, and fuel tanks, indicated generally at 50, may be supported on the chassis 20.

A harvesting structure 55 is operatively connected to the chassis 20. The illustrated harvesting structure 55 is configured to remove cotton from the field 35. Alternatively, the harvesting structure 55, in other implementations, is configured to remove other crop. An air duct system 60 is operatively connected to the harvesting structure 55. An accumulator 65 is operatively connected to the air duct system 60. The accumulator 65 is configured to receive cotton, or other crop, from the harvesting structure 55 via the air duct system 60. A feeder 70 is operatively connected to the chassis 20. The feeder 70 is configured to receive cotton, or other crop, from the accumulator 65. The feeder 70 includes a plurality of rollers 75 configured to compress the cotton, or other crop, and transfer the cotton, or other crop, to a round module builder 80. As shown, the module builder 80 is supported in generally by the chassis 20.

While a round module builder 80 is shown and described as part of a cotton harvester 15, this disclosure is not limited to such an application of a module builder. More specifically, other implementations considered for this disclosure include, but are not limited to, a pull type round baler. A pull type round baler may not include a chassis, header, air system, and other components shown on the cotton harvester 15. Rather, the pull behind round baler may have a hitch, wheels, and a crop pickup assembly coupled to the round module builder. A person having skill in the relevant art understands how the teachings of this disclosure can be applied to any round-type baler or module builder and this disclosure is not limited in application to the cotton harvester 15 shown and described herein. After a round module 85 is formed and wrapped, a module handling system 90 receives the round module 85. The module handling system 90 temporarily supports the round module 85 above the ground 35 and then discharges it from the harvester 10.

Figure 2:
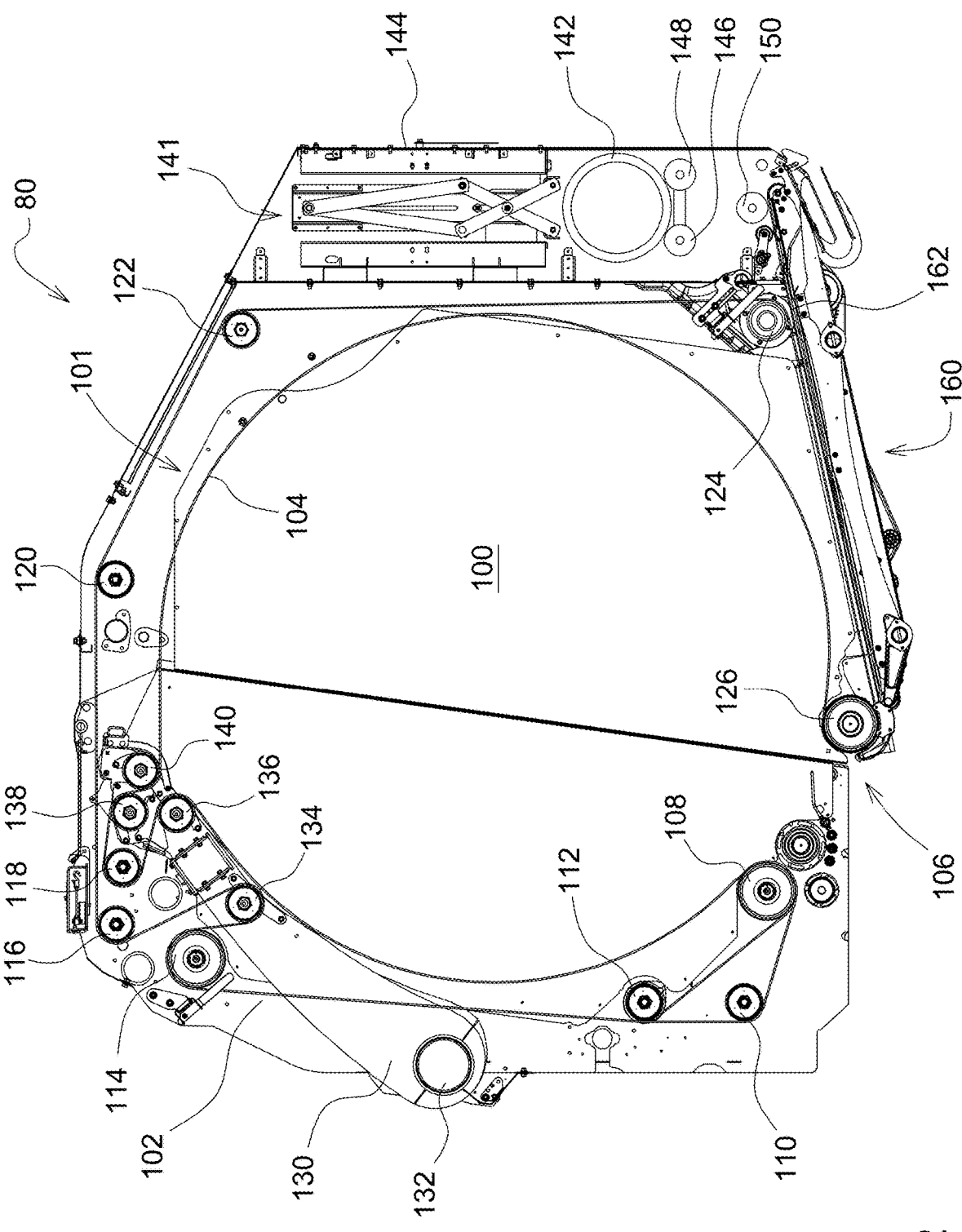
FIG. 2 is a cross-sectional side view of a round module builder.

Referring to FIG. 2, the module builder 80 includes a module-forming chamber 100 including a plurality of endless members in the form of continuous belts 104 defining a circumference of the module-forming chamber 100. The module forming chamber 100 is defined by a rear portion 101 and a front portion 102. Once the bale 85 (FIG. 1) is formed, the rear portion 101 swings out and away from the front portion 102 to release the bale 85 to the module handling system 90.

The plurality of continuous belts 104 are supported in a side-by-side relationship across a support roll arrangement comprising a plurality of fixed rolls and a plurality of movable rolls. Specifically, proceeding clockwise from a chamber inlet 106, where crop enters the module-forming chamber 100, the fixed rolls include a lower drive roll 108, a first separation roll 110, a second separation roll 112, an upper drive roll 114, an upper front frame roll 116, an upper rear frame roll 118, an upper front gate roll 120, an upper rear gate roll 122, a lower rear gate roll 124, and a lower front gate roll 126, all coupled for rotation within the round module builder 80.

In FIG. 2, a conventional pair of transversely spaced belt tensioning or rockshaft arms 130 are pivotally mounted to a belt tensioning arm pivot 132. The plurality of movable rolls comprise a first movable roll 134, a second movable roll 136, a third movable roll 138, and a fourth movable roll 140, which extend between and have opposite ends, respectively, rotatably coupled to the transversely-spaced belt tensioning arms 130. As illustrated, one or more of the fixed rolls are driven to cause the plurality of continuous belts 104 to be driven, with the drive direction being such as to cause the incoming cotton, or other crop, to travel counterclockwise as illustrated, and added as a spiral layer to a growing round module 85. As the round module 85 expands within the module-forming chamber 100, the transversely spaced belt tensioning arms 130 rotate counterclockwise until a round module 85 (FIG. 1) having a predetermined diameter has been formed in the module-forming chamber 100.

Along the rear portion of the round module builder 80 may be a wrapping assembly 141 that houses one or more wrap rolls 142. In the implementation illustrated in FIG. 2, only one wrap roll 142 is shown positioned in the wrapping assembly 141. However, the wrapping assembly 141 is configured to stack multiple wrap rolls 142 on top of one another within a wrap roll hopper 144. The bottom most wrap roll 142 rests on a front carry roller 146 and a rear carry roller 148. The front and rear carry rollers 146, 148 are coupled to a bracket (not shown) that allows the front and rear carry rollers 146, 148 to move along a linear path towards, and away from, a lower wrap roller 150.

The wrap roll 142 includes a wrap material sized to cover the exterior circumference of the round module 85 (FIG. 1), as it is being formed in the chamber 100. The wrap material transitions from the wrap roll 142, partially around the front carry roller 146, between the front carry roller 146 and the lower wrap roller 150, and partially around the lower wrap roller 150. The wrap is delivered to the lower front gate roll 126. The lower front gate roll 126 rotates about a longitudinal axis as the belts move in the module forming chamber 100. Once the wrap material enters the module forming chamber 100 at the lower front gate roll 126, the wrap material follows the continuous belts 104 about the circumference of the round module 85 until the outer surface of the module is substantially covered with wrap material. An assembly (not specifically shown) then severs the wrap material from the wrap roll 142. The wrap material adheres to the round module 85 to substantially maintain its form once ejected from the module forming chamber 100.

In one aspect of the wrapping assembly 141 illustrated in FIG. 2, the wrap material may be stretched as it extends between the lower wrap roller 150 and the lower front gate roll 126. More specifically, one or more of the front and rear carry rollers 146, 148 and the lower wrap roller 150 are powered to feed wrap material from the wrap roll 142 to the module forming chamber 185. Further, the wrap material may be pinched between the front and rear carry rollers 146, 148 and the lower wrap roller 150 as it is fed from the wrap roll 142 to the module forming chamber 100.

The powered rollers 146, 148, 150 move the wrap material toward the lower front gate roll 126 at a feed speed. The feed speed may be slightly less than the speed required to match the rotation speed of the round module 85 (FIG. 1). In one non-limiting example, the round module includes a twenty-three foot circumference and thereby requires approximately twenty-three linear feet of wrap material per rotation. However, the wrapping assembly 141, in one implementation, only has a feed speed of twenty-two linear feet per rotation. In this implementation, as the wrap material transitions from the wrap roll 142 to the module forming chamber 100, the wrap material is stretched as it moves between the lower wrap roller 150 and the lower front gate roll 126.

Stretching the wrap material as it transitions from the wrapping assembly 141 to the module forming chamber 100 provides for a tightly packed round module 85 that has a high density and therefor transports a large amount of harvested crop. Further, the wrap material compresses the round module 85 so that it maintains the proper form. Properly covering the outer surface of the round module 85 also limits or inhibits moisture from penetrating into outer surface of the round module 85. It is important that the wrap material is evenly distributed about the outer surface of the round module 85, and also that the wrap material experiences no misfeeds. Otherwise, the round module 85 may lose form causing it to possibly fall apart, become saturated with water while in the field, or the like.

In operation, the harvester 10 is driven through the field 35 to harvest cotton or other crop. The illustrated harvesting structure 55 picks cotton from cotton plants in the field 35. Alternatively, the harvesting structure 55 strips the cotton from the cotton plants. Cotton is transferred to the accumulator 65 via the air duct system 60. The accumulator 65 holds the cotton until a predetermined cotton level is reached and then transfers the cotton to the feeder 70. In an exemplary implementation, the accumulator 65 transfers cotton to the feeder 70 approximately four times for each round module 85 produced. When the feeder 70 receives cotton, the plurality of rollers 75 are activated to compress the cotton. The compressed cotton is transferred to the round module builder 80.

After the round module builder 80 receives compressed cotton, the plurality of belts 104 rotate the cotton into the round module 85. After the round module builder 80 receives sufficient cotton from the feeder 70, the round module is wrapped and the round module 85 is ejected onto the module handling system 90. The module handling system 90 supports the round module 85 and then discharges it from the harvester 10.

A wrap floor assembly 160 is positioned partially between the lower wrap roller 150 and the front gate roll 126. The wrap floor assembly 160 includes, in different implementations, a plurality of endless members 162 such as a plurality of continuous wrap floor belts 163 or the like positioned thereon. The wrap floor belts 163 and the wrap floor assembly 160 guide the wrap material, in part, from the wrap roll 142 to the lower front gate roll 126 and ultimately into the module forming chamber 100. As will be described in greater detail below, the wrap floor assembly 160 is movable between a lowered or disengaged conformation relative to portions of the module builder 80 as supported in generally by the chassis 20, and a raised or engaged conformation relative to the portions of the module builder 80 as supported in generally by the chassis 20.

Figure 3:
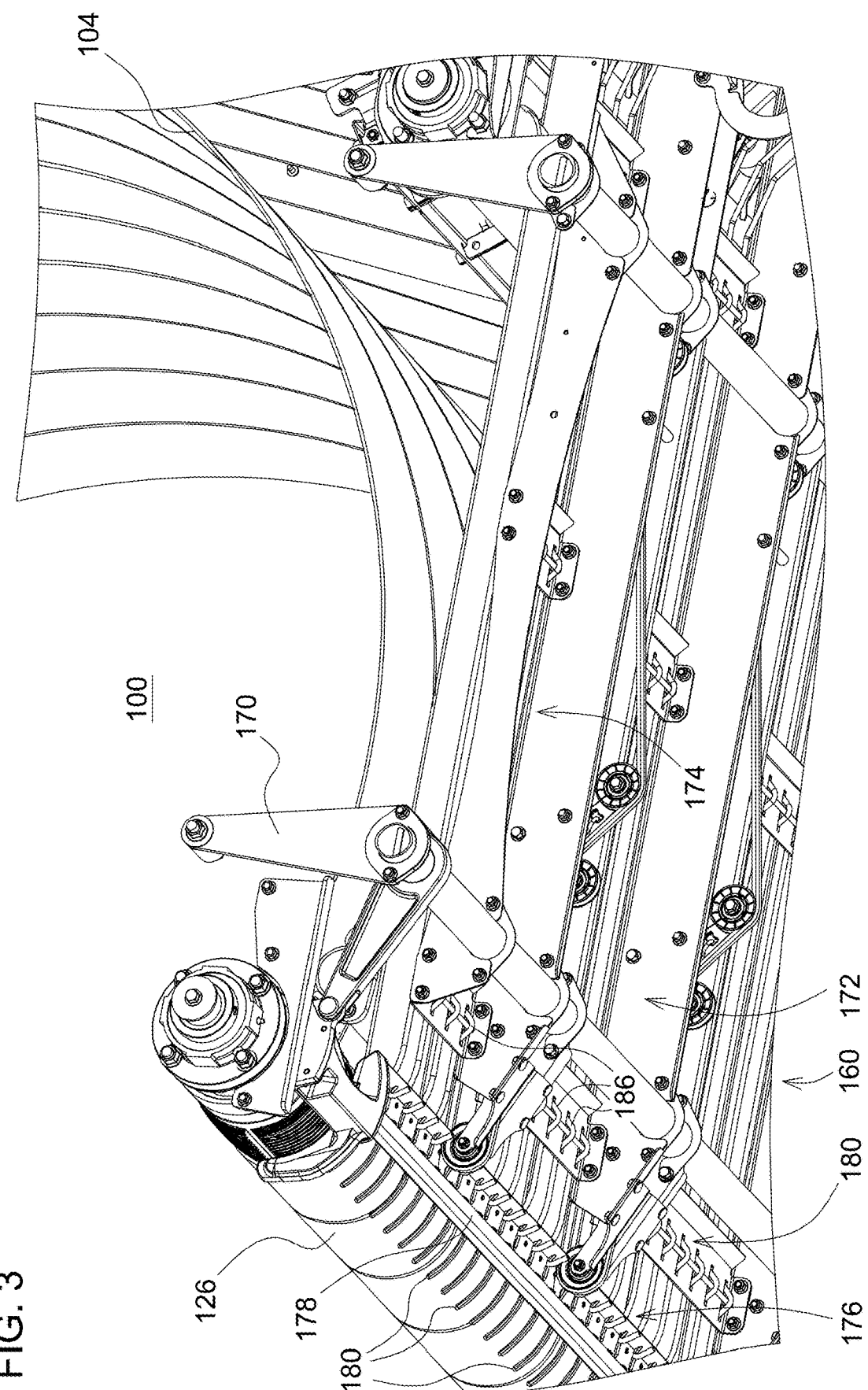
FIG. 3 is a partial perspective view a wrapping assembly.
Figure 4:
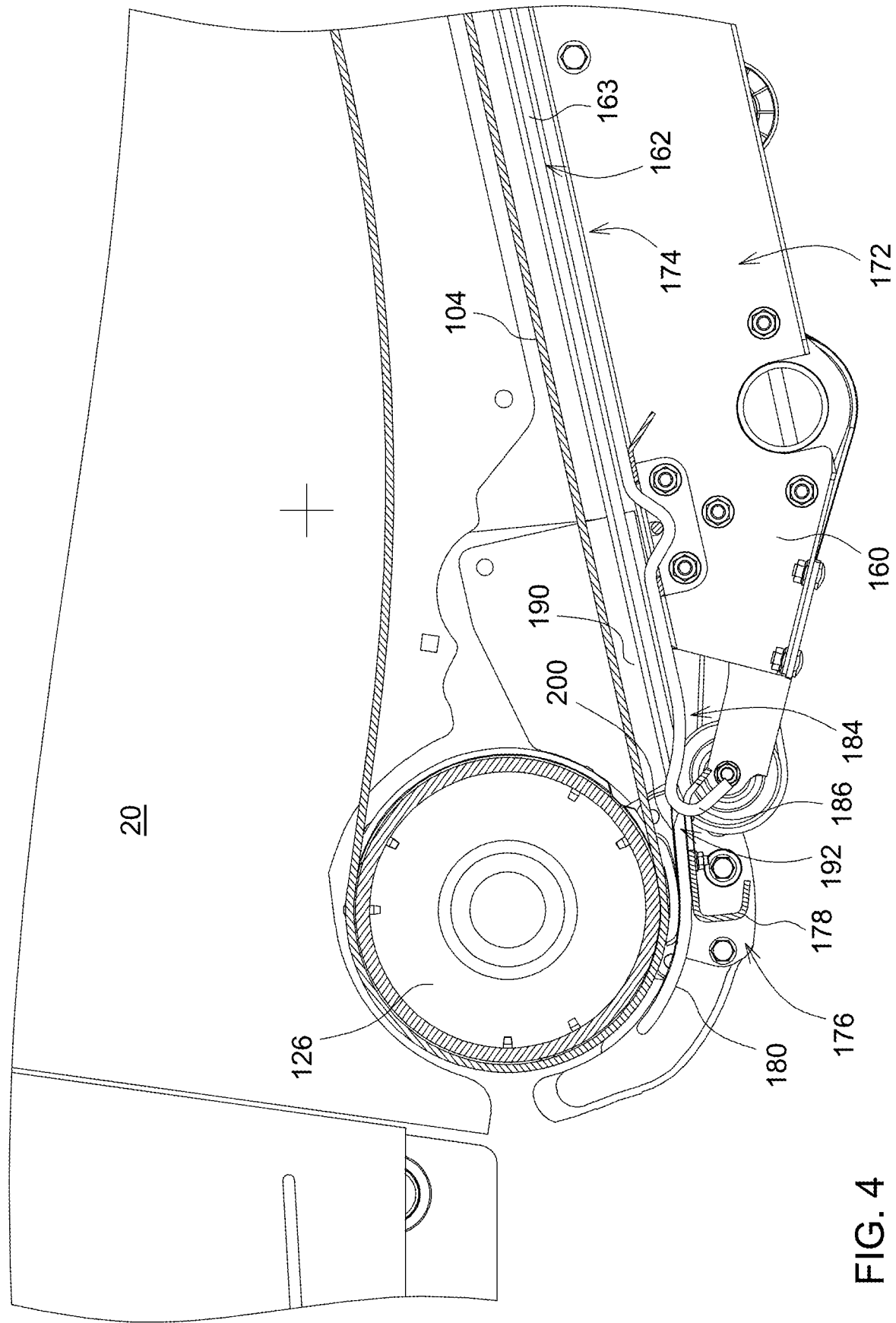
FIG. 4 is a partial side view of a floor of a wrapping assembly in a first position.
Figure 5:
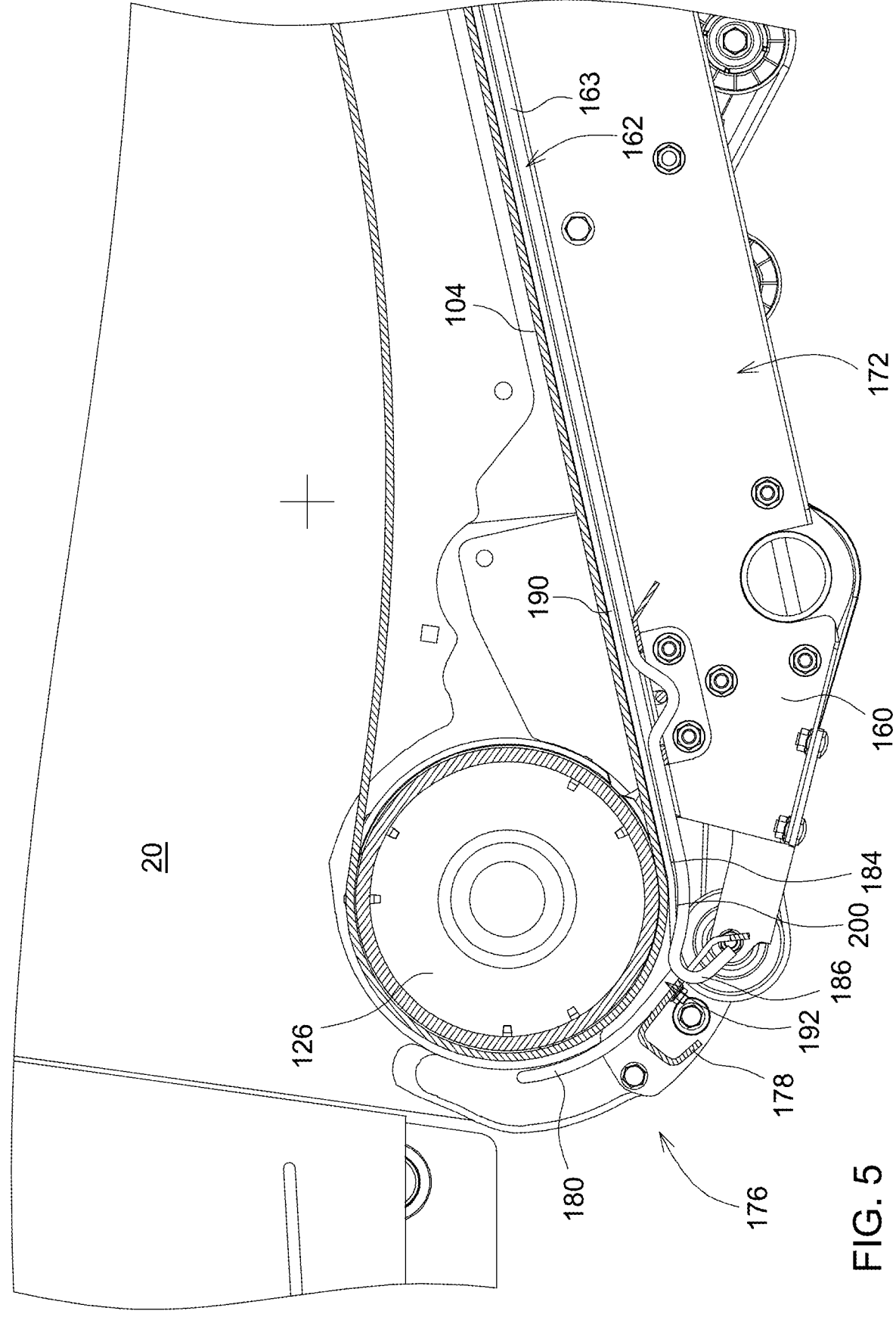
FIG. 5 is a partial side view of a floor of a wrapping assembly in a second position.

Although any mechanical, electromechanical, and/or hydraulic/mechanical system may be used to move the wrap floor assembly 160 between the lowered or disengaged conformation and the raised or engaged conformation relative to portions of the module builder 80, as further illustrated in FIG. 3, a four bar linkage 170 may be operatively connected to the wrap floor assembly 160. The four bar linkage is not illustrated in FIG. 2. The four bar linkage 170 is configured to adjust the position of the wrap floor assembly 160 with respect to the front gate roll 126 for directing the wrap (not shown) past the front gate roll 126 and around the round module 85 being formed. The wrap floor assembly 160 is located in a first position as illustrated in FIG. 4 and is moved to a second position as illustrated in FIG. 5. In FIG. 4, the wrap floor assembly 160 is spaced from the gate roll 126 and in FIG. 5 the wrap floor is moved closer to the gate roll 126 to enable the gate roll 126 to direct the wrap around the bale being formed. As such the wrap floor assembly 160 being disposed in the first position as illustrated in FIG. 4 corresponds to the lowered or disengaged conformation relative to portions of the module builder 80 as supported in generally by the chassis 20, and the wrap floor assembly 160 being disposed in the second position as illustrated in FIG. 5 corresponds to the raised or engaged conformation relative to the portions of the module builder 80 as supported in generally by the chassis 20.

The four bar linkage 170 is not illustrated in these FIGS. 4 and 5. However, it is to be appreciated and observed by comparing the differences in relative positions of the various mechanisms that the wrap floor assembly 160 when moved from the first position as illustrated in FIG. 4 (lowered) to the second position as illustrated in FIG. 5 (raised) moves both vertically (upwardly as viewed in FIGS. 4 and 5) and forwardly (to the left as viewed in FIGS. 4 and 5) relative to the module builder 80 as supported in generally by the chassis 20. It is further to be appreciated and observed by comparing the differences in relative positions of the various mechanisms that the wrap floor assembly 160 when moved from the second position as illustrated in FIG. 5 (raised) to the first position as illustrated in FIG. 4 (lowered) moves both downwardly and rearwardly (to the right as viewed in FIGS. 4 and 5) relative to the module builder 80 as supported in generally by the chassis 20.

The wrap floor assembly 160 includes a frame structure 172 that supports a floor 174 upon which, or through which, the wrap floor belts 163 move. A guide rod structure 176 is operatively connected to the frame structure 172 and is rotatably fixed with respect to the gate roll 126. The guide rod structure 176 includes a shaft 178 extending from one side of the module forming chamber 100 to another side of the module forming chamber 100 and is substantially equal to or greater than the width of the module 85 being formed in the chamber 100. In other implementations, the shaft 178 includes a square tube which is either hollow or which is solid. Other configurations of the shaft 178 are contemplated. A plurality of rods 180 are fixedly coupled to the shaft 178. Each of the rods 180 includes a bend which directs the free ends of the rods 180 toward the gate roll 126. Each of the rods 180 extends generally perpendicular to a longitudinal axis of the shaft 178, which extends along a rotating axis of the gate roll 126. Other implementations are contemplated and include rods 180 that are substantially straight. In the illustrated figures, the rods 180 are regularly spaced such that there is an equal amount of space between each of the rods with respect to an adjacent rod. Other spacings of rods are possible as necessary or desired.

A wrap floor guide 184 is located along the floor 174 and includes a plurality of extenders 186 that extend from the floor 174. In different implementations, the extenders 186 are formed as a part of the floor 174 or are formed as a separate part fixedly coupled to the floor 174. Each of the extenders 186 includes a bend that directs the free ends of the extenders 186 downward and away from the gate roll 126. Other implementations are contemplated. In the illustrated figure, the extenders 186 are regularly spaced such that there is an equal amount of space between each of the extenders with respect to an adjacent extender. Other spacings of extenders are contemplated.

As illustrated in FIG. 4, in a first position of the floor 174, a gap 190 is located or otherwise formed between the floor 174 and the belt 104. As illustrated in FIG. 5, the gap 190 is reduced in size as the four bar link 170 moves the floor 174 closer to the belt 104. In this condition of FIG. 4, the wrap moves from the roll 142 in response to movement of the rolls 146, 148, and 150, along the length of the floor 174 and toward the roller 126. As the leading edge of the wrap moves toward the end of the floor 174, the wrap reaches a transition location 192 located between the extenders 186 and the guide rod structure 176. A mat 200 is operatively connected to the floor 160 and to the guide rod structure 176. As the leading edge of the wrap moves from the floor 160 to the roll 126, the mat 200 directs and provides a support surface for the wrap across the transition location 192.

Figure 6:
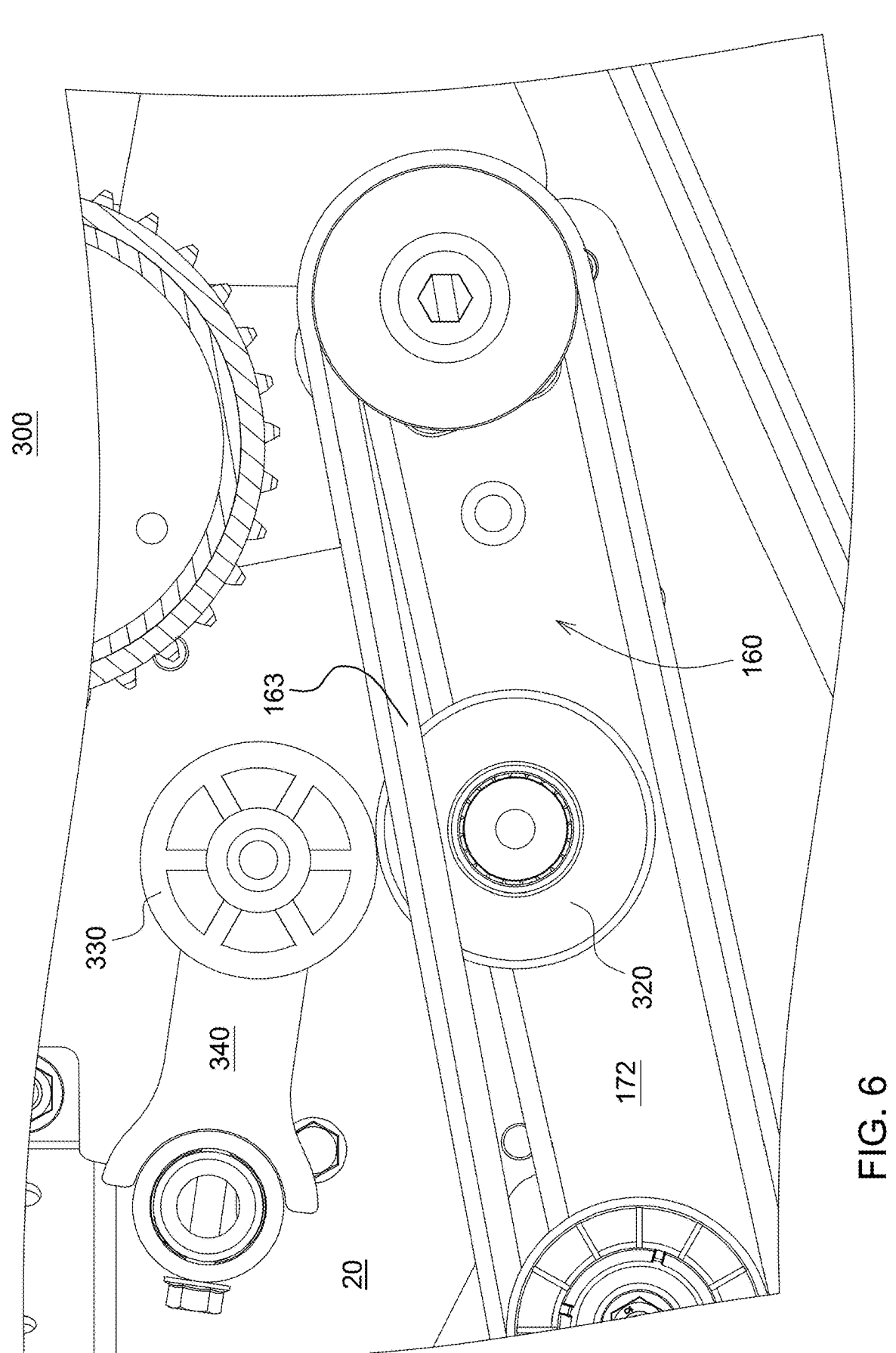
FIG. 6 is a side elevational view of a nonhomogeneous nip system in accordance with an example implementation.

FIG. 6 is a side elevational view of a nonhomogeneous nip system 300 in accordance with an example implementation for use with an associated wrap floor assembly 160 that is movable between lowered (FIG. 4) and raised (FIG. 5) positions relative to a chassis 20 supporting a module builder 80 of an associated harvester 10. In particular, FIG. 6 illustrates the subject nip system 300 disposed in a configuration corresponding to the associated wrap floor assembly 160 being in the lowered (FIG. 4) position relative to the chassis 20.

The nip system 300 in general includes a plurality of wrap frame roller members 320, and a plurality of chassis roller members 330. In the implementation illustrated, the plurality of wrap frame roller members 320 are connected with the frame structure 172 of the associated wrap floor assembly 160. In that way, the plurality of wrap frame roller members 320 are movable together with the associated wrap floor assembly 160 between the lowered (FIG. 4) position relative to the chassis 20 of the associated harvester 10, and the raised (FIG. 5) position relative to the chassis 20 of the associated harvester 10.

In a further implementation, the plurality of wrap frame roller members 320 are connected with the frame structure 172 of the associated wrap floor assembly 160 using a biased axle member or the like, wherein the plurality of wrap frame roller members 320 are carried on an axle that is biased such as by a spring or the like acting against the axle that extends in an elongate groove or slot provided in the frame structure 172. In that way, the plurality of wrap frame roller members 320 are first movable relative to the frame structure 172 generally in the vertical direction as viewed in FIGS. 6 and 7, and also movable overall together with the associated wrap floor assembly 160 between the lowered (FIG. 4) position relative to the chassis 20 of the associated harvester 10, and the raised (FIG. 5) position relative to the chassis 20 of the associated harvester 10. By biasing the wrap frame roller members 320 in this manner may help coordinate or otherwise synchronize contact between the wrap frame roller members 320 and the plurality of chassis roller members 330 for movement of the associated wrap floor assembly 160 between the lowered and raised positions relative to the chassis 20 of the associated harvester 10.

Preferably, the plurality of chassis roller members 330 are biased relative to the chassis 20 of the associated harvester 10 (downwardly as viewed in FIG. 6) towards the associated wrap floor assembly 160.

In accordance with an example implementation, the plurality of wrap frame roller members 320 are connected with the frame structure 172 at a position relative to the plurality of chassis roller members 330 to cause nips to be formed for the associated wrap floor assembly 160 being disposed in the lowered position relative to the chassis 20. That is, first nips are formed between the plurality of chassis roller members 330 and the plurality of wrap frame roller members 320 for the associated wrap floor assembly 160 being disposed in the lowered position relative to the chassis 20. The nips in accordance with an example implementation can be accomplished by proper section of the lateral spacing between the plurality of wrap frame roller members 320 and the plurality of chassis roller members 330. That is, the plurality of wrap frame roller members 320 and the plurality of chassis roller members 330 may be spaced apart by selected distances substantially in the horizontal direction as viewed in FIGS. 6 and 7 in order to realize nonhomogeneous nips in accordance with an example implementation.

In accordance with an example implementation, the plurality of wrap frame roller members 320 are connected with the frame structure 172 at a position relative to the plurality of chassis roller members 330 to cause nonhomogeneous nips to be formed for the associated wrap floor assembly 160 being disposed in the lowered position relative to the chassis 20, and for the associated wrap floor assembly 160 being disposed in the raised position relative to the chassis 20. That is, first nips are formed between the plurality of chassis roller members 330 and the plurality of wrap frame roller members 320 for the associated wrap floor assembly 160 being disposed in the lowered position relative to the chassis 20. In addition, second nips are formed between the plurality of chassis roller members 330 and associated wrap floor belts 163 of the associated wrap floor assembly 160 for the associated wrap floor assembly 160 being disposed in the raised position relative to the chassis. The nonhomogeneous nips in accordance with an example implementation can be accomplished by proper section of the lateral spacing between the plurality of wrap frame roller members 320 and the plurality of chassis roller members 330. That is, the plurality of wrap frame roller members 320 and the plurality of chassis roller members 330 may be spaced apart by selected distances substantially in the horizontal direction as viewed in FIGS. 6 and 7 in order to realize nonhomogeneous nips in accordance with an example implementation.

In accordance with a further example implementation, the plurality of wrap frame roller members 320 are connected with the frame structure 172 at a position relative to the plurality of chassis roller members 330 to cause persistent nonhomogeneous nips to be formed for the associated wrap floor assembly 160 being disposed in the lowered position relative to the chassis 20, for the associated wrap floor assembly 160 being disposed in the raised position relative to the chassis 20, and for movement of the associated wrap floor assembly 160 being disposed between the lowered and raised positions relative to the chassis. That is, first nips are formed between the plurality of chassis roller members 330 and the plurality of wrap frame roller members 320 for the associated wrap floor assembly 160 being disposed in the lowered position relative to the chassis 20. In addition, second nips are formed between the plurality of chassis roller members 330 and associated wrap floor belts 163 of the associated wrap floor assembly 160 for the associated wrap floor assembly 160 being disposed in the raised position relative to the chassis. In further addition, a third nip is formed between the plurality of chassis roller members 330 and a combination of the plurality of wrap frame roller members 320 and the associated wrap floor belts 163 for the associated wrap floor assembly 160 being disposed at a transition conformation between the lowered and raised positions relative to the chassis of the associated harvester. The persistent nonhomogeneous nips in accordance with an example implementation can be accomplished by proper section of the lateral spacing between the plurality of wrap frame roller members 320 and the plurality of chassis roller members 330. That is, the plurality of wrap frame roller members 320 and the plurality of chassis roller members 330 may be spaced apart by selected distances substantially in the horizontal direction as viewed in FIGS. 6 and 7 in order to realize persistent nonhomogeneous nips in accordance with an example implementation.

The nip system 300 in accordance with the above example implementation is persistent for all positions of the associated wrap floor assembly 160 relative to the chassis of the associated harvester. That is, the nip system is persistent as comprising series of uninterrupted or nips as the associated wrap floor assembly 160 is permitted to move relative to the chassis of the associated harvester from the lowered position to the raised position, from the raised position to the lowered position, and between the lowered and raised positions. The nip system 300 in accordance with the example implementation is nonhomogeneous as a series of uninterrupted different nips are formed, sequentially, as the associated wrap floor assembly 160 is permitted to move relative to the chassis of the associated harvester from the lowered position to the raised position, from the raised position to the lowered position, and between the lowered and raised positions. Overall, a sustained nip is provided, wherein the sustained (persistent) nip is formed by at least one of: the plurality of chassis roller members 330 biased against the plurality of wrap frame roller members 320, the plurality of chassis roller members 330 biased against the associated wrap floor belts 163, or the plurality of chassis roller members 330 biased against the combination of the plurality of wrap frame roller members 320 and the associated wrap floor belts 163.

The nip system 300 is persistent. This holds the wrap material fixed in place. In addition, and to help to prevent the wind from motivating withdrawal movement of the wrap material backwards through the feed system (away from the chamber inlet 106, and towards the wrapping assembly 141, the plurality of wrap frame roller members 320 are unidirectionally rotatably connected with the frame structure of the associated wrap floor assembly. In the example implementation, the plurality of wrap frame roller members 320 are prevented from rotating clockwise as viewed in FIG. 6. In an example implementation, a ratchet and pawl mechanism (not shown) may be used. Other equivalent mechanical and/or electromechanical systems may be used as well.

Figure 7:
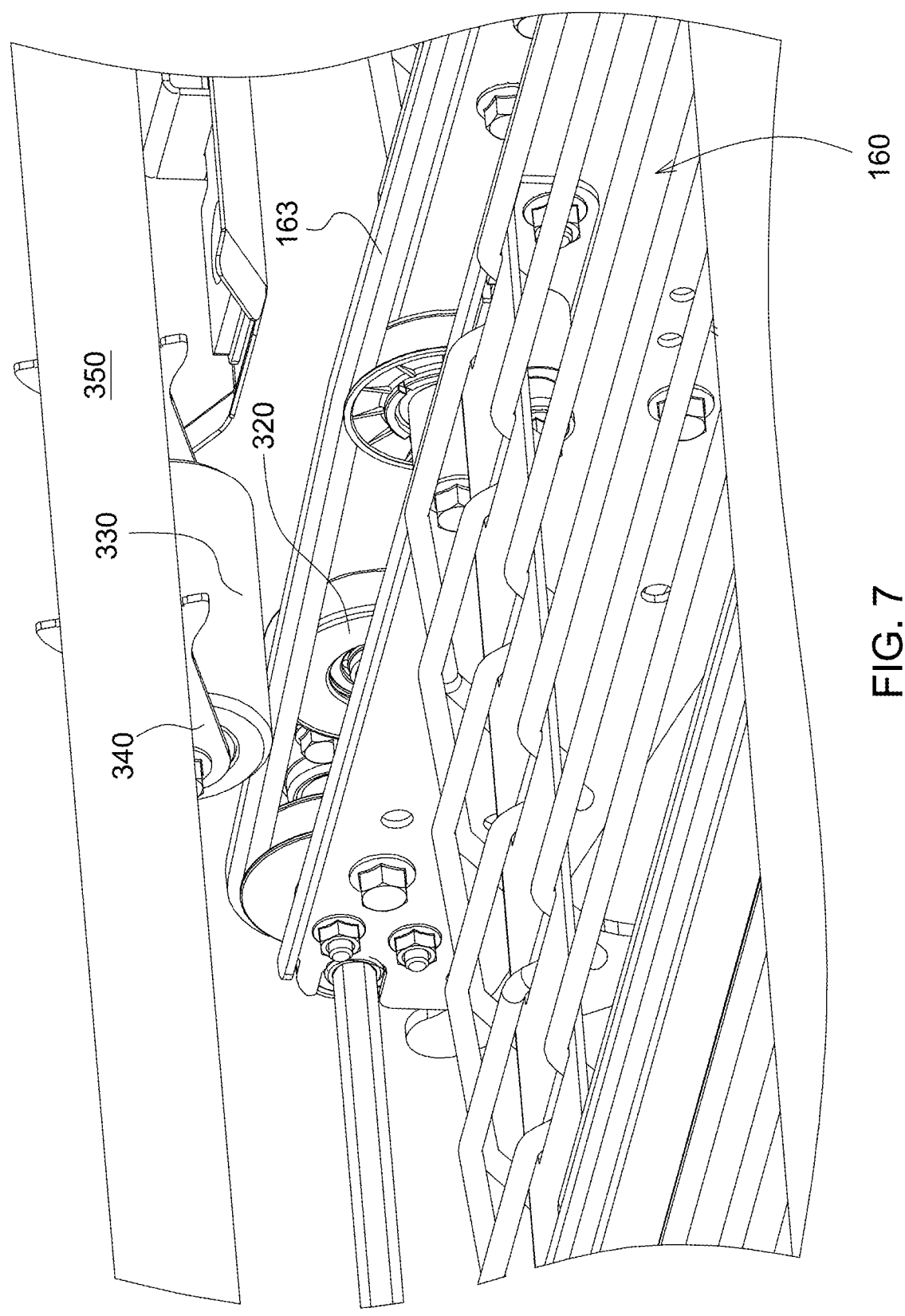
FIG. 7 is an oblique elevational view of the nonhomogeneous nip system of FIG. 6 in accordance with an example implementation.

FIG. 7 is an oblique elevational view of the nonhomogeneous nip system 300 of FIG. 6 in accordance with an example implementation. This showing illustrates the plurality of chassis roller members 330 biased against and in contact with the associated wrap floor belts 163. In use of the subject system, the wrap material is securely held in the nip between the plurality of chassis roller members 330 and the associated wrap floor belts 163. However, the wrap material is not shown to not obscure the mechanism of the subject nip system 300.

With continued reference to FIG. 7, as can be seen, the plurality of chassis roller members 330 are substantially wider than the plurality of wrap frame roller members 320. In that way, a portion (the right side as viewed in FIG. 7) of the plurality of wrap chassis roller members 330 is configured for selective physical contact with the plurality of wrap frame roller members 320 for the associated wrap floor assembly 160 being disposed in the lowered (first) position (FIGS. 4, 6, 14) relative to the chassis 20 of the associated harvester 10, and another portion (the left side as viewed in FIG. 7) of the plurality of chassis frame roller members 330 is configured for selective physical contact with the associated wrap floor belts 163 for the associated wrap floor assembly 160 being disposed in the raised (second) position (FIGS. 5, 7, 15) relative to the chassis 20 of the associated harvester 10.

It is to be appreciated that the associated wrap floor assembly 160 is disposed in the lowered (first) position relative to the chassis 20 of the associated harvester 10 in FIG. 6 and in the raised (second) position relative to the chassis 20 of the associated harvester 10 in FIG. 7. Accordingly, the portion (the right side as viewed in FIG. 7) of the plurality of chassis frame roller members 330 are in physical contact with the plurality of wrap frame roller members 320 for the associated wrap floor assembly 160 being disposed in the lowered position (FIG. 6) relative to the chassis 20 of the associated harvester 10. For the associated wrap floor assembly 160 being disposed in the raised position relative to the chassis 20 of the associated harvester 10, the portion (the left side as viewed in FIG. 7) of the plurality of chassis frame roller members 330 are in physical contact with the associated wrap floor belts 163.

The nip system 300 in general includes a plurality of wrap frame roller members 320, and a plurality of chassis roller members 330. In the implementation illustrated, the plurality of wrap frame roller members 320 are connected with the frame structure 172 of the associated wrap floor assembly 160. In that way, the plurality of wrap frame roller members 320 are movable together with the associated wrap floor assembly 160 between the lowered (FIG. 4) position relative to the chassis 20 of the associated harvester 10, and the raised (FIG. 5) position relative to the chassis 20 of the associated harvester 10.

Figure 8:
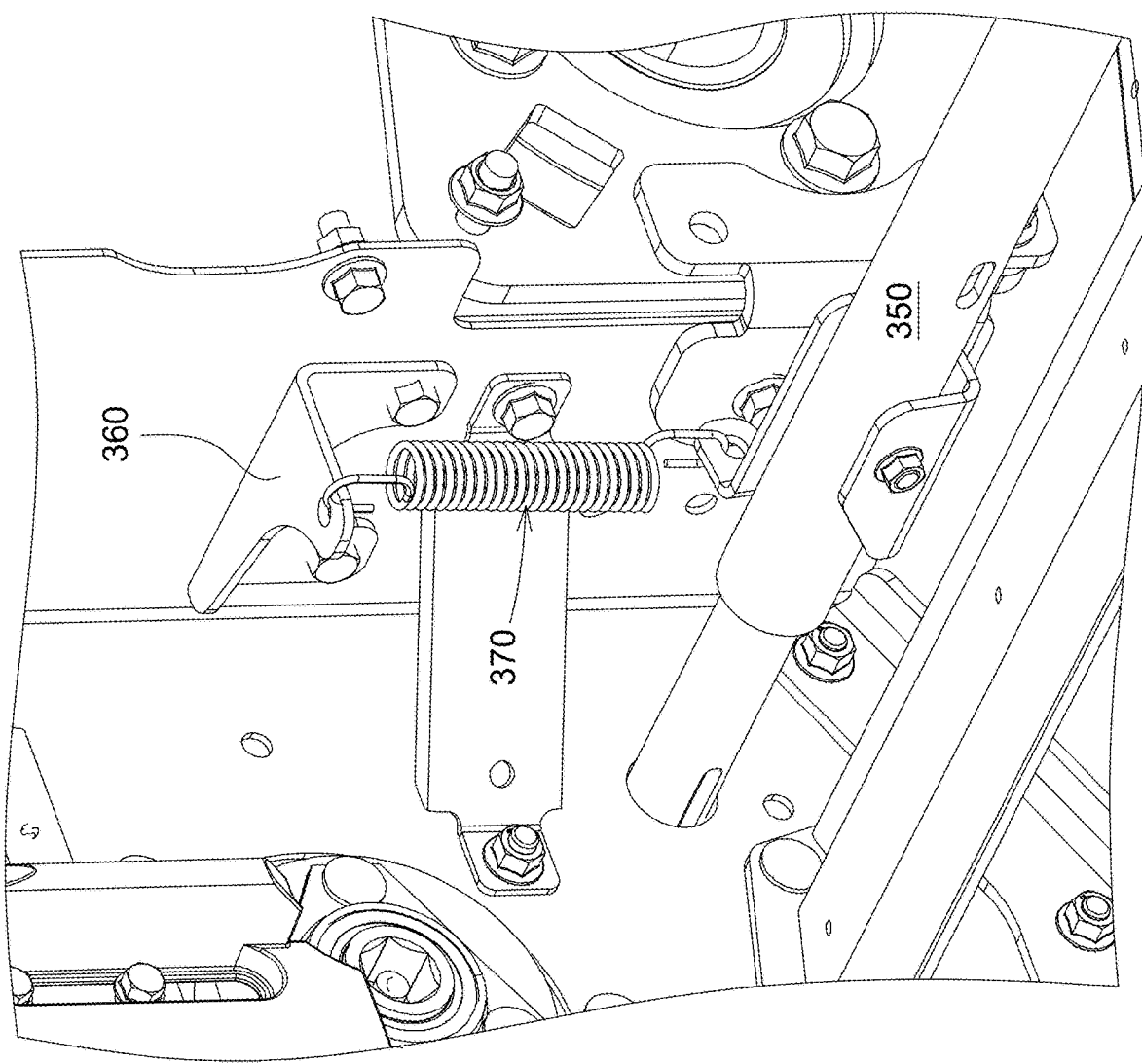
FIG. 8 is an oblique elevational view of a biasing portion of the persistent nonhomogeneous nip system of FIG. 6 in accordance with an example implementation.

FIG. 8 is an oblique elevational view of a biasing portion of the persistent nonhomogeneous nip system 300 of FIGS. 6 and 7 in accordance with an example implementation. With reference to that Figure and with continued reference to FIGS. 6 and 7, the plurality of chassis roller members 330 are carried on arm members 340 that extend from a common support shaft 350. A bracket 360 is affixed to the common support shaft 350 and provides an attachment point for a spring member 370 that is attached on one end to the bracket 360, and on the other end with a portion of the chassis 20 of the harvester 10. In that way, the spring biases the common support shaft 350 and in turn the arm members 340, and then further in turn the plurality of chassis roller members 330 towards the associated wrap floor assembly 160.

It is to be appreciated that for the wrap floor assembly 160 disposed in the lowered or disengaged position such as shown in FIGS. 6 and 7, the wrap floor belts 163 are typically stationary and, as such, an undesirable frictional force may be induced in the wrap material as it is drawn into the wrap chamber were the plurality of chassis roller members 330 biased against the wrap floor belts 163 to form the nip for holding the wrap material for the associated wrap floor assembly 160 disposed in the lowered or disengaged position. Some types of wrap material may be more sensitive to these frictional forces. In the case of pre-partitioned lengths of wrap material that may be interleaved together at lapped joints, it is possible that these frictional forces may be enough tensile force necessary for prematurely separating the joint and possibly causing misfeeds, wasted product, or the like. However, in accordance with the example implementations herein, the nip that is formed for the wrap floor assembly 160 disposed in the lowered or disengaged position is between the plurality of chassis roller members 330 and the wrap frame roller members 320 that are freely rotatable as viewed in FIGS. 6 and 7. Thereby the frictional forces are well below the tensile force necessary for prematurely separating the joint and possibly causing misfeeds, wasted product, or the like.

Figure 9:
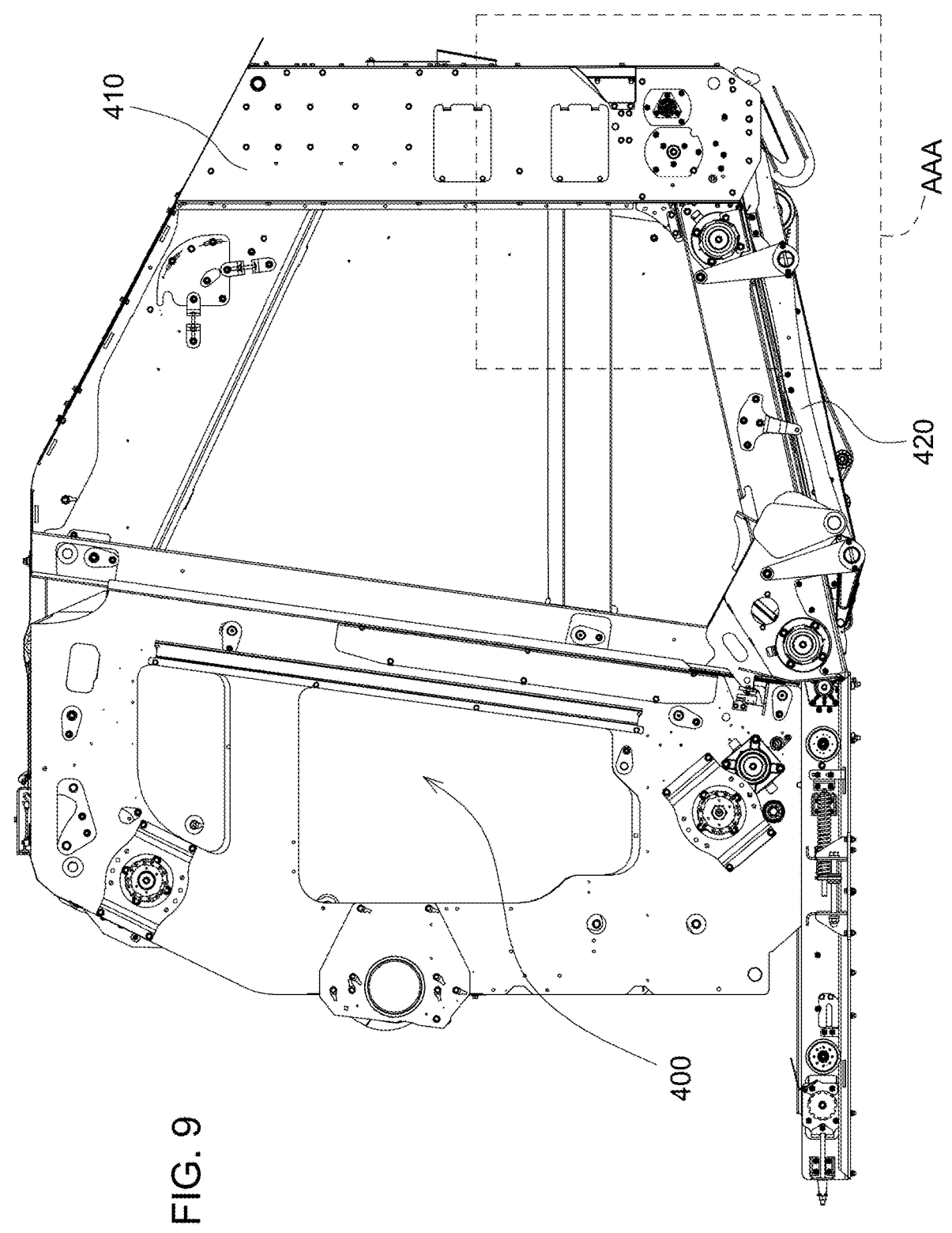
FIG. 9 is a partial cross-sectional side view of a round module builder 400 in accordance with a further example implementation.
Figure 10:
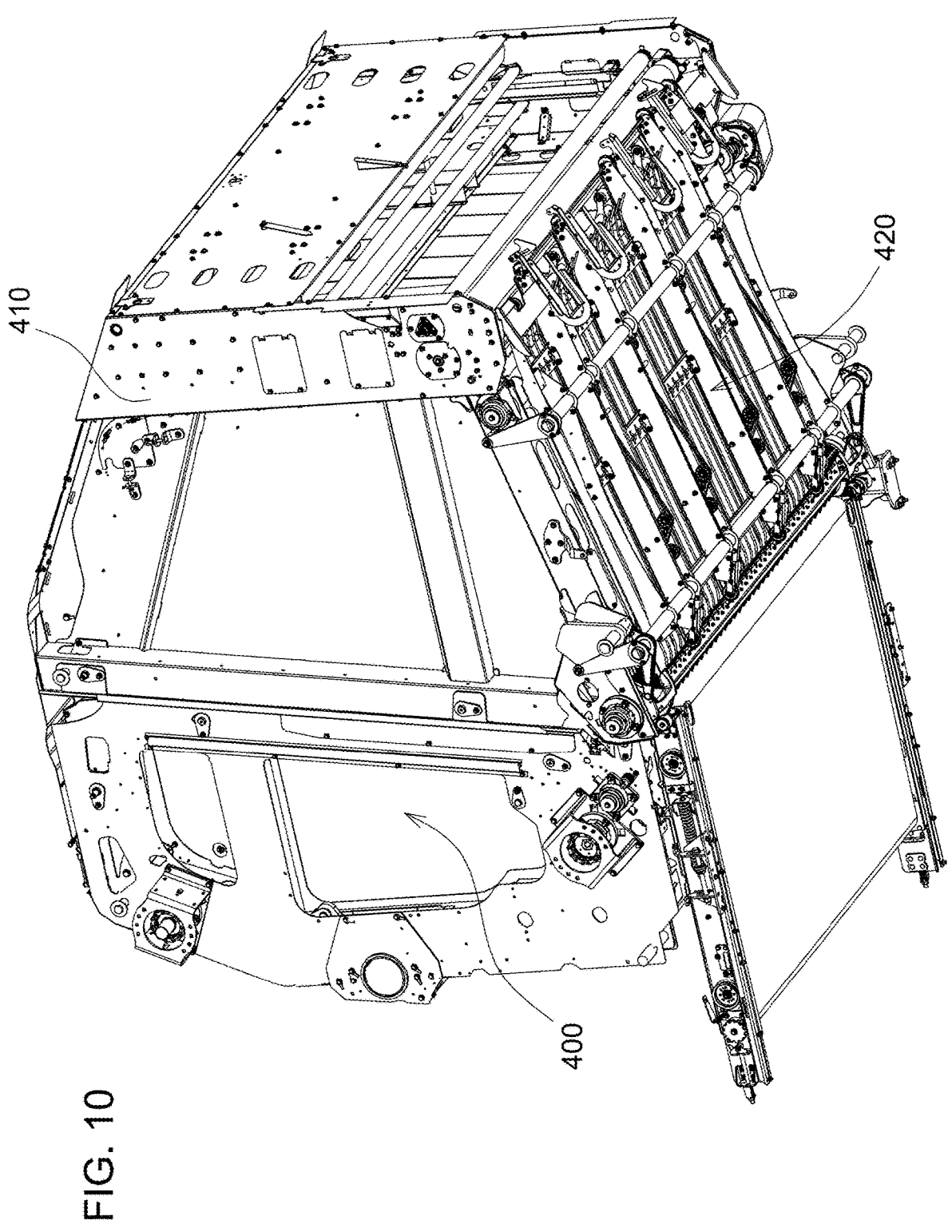
FIG. 10 is an oblique partial cross-sectional side view of the round module builder 400 shown in FIG. 9 in accordance with the further example implementation.
Figure 11:
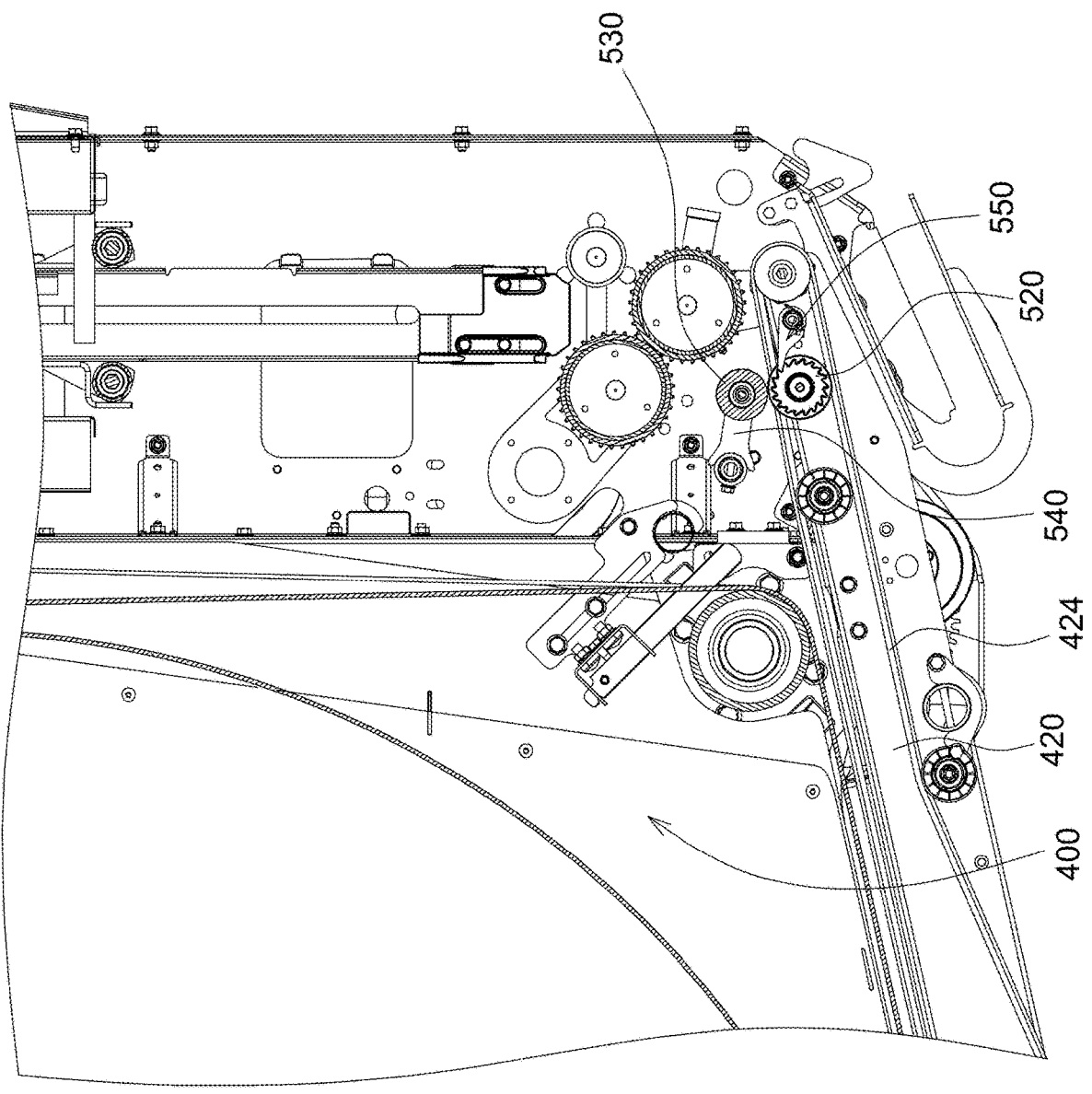
FIG. 11 is an enlarged partial cross-sectional side view of the portion AAA of the round module builder 400 shown in FIG. 9 showing a nip system in accordance with the further example implementation.

FIG. 9 is a partial cross-sectional side view of a round module builder 400 in accordance with a further example implementation. FIG. 10 is an oblique partial cross-sectional side view of the round module builder 400 shown in FIG. 9 in accordance with the further example implementation. FIG. 11 is an enlarged partial cross-sectional side view of the portion AAA of the round module builder 400 shown in FIG. 9 in accordance with the further example implementation. Along the rear portion of the round module builder 400 may be a wrapping assembly 410 that houses one or more wrap rolls (not shown).

A wrap floor assembly 420 includes, in different implementations, a plurality of endless members 422 such as a plurality of continuous wrap floor belts 424 or the like positioned thereon. The wrap floor belts 424 and the wrap floor assembly 420 guide the wrap material, in part, from the wrap roll to a lower front gate roll 126 and ultimately into the module forming chamber of the module builder 400. As described, the wrap floor assembly 410 is movable between a lowered or disengaged conformation relative to portions of the module builder 400 as supported in generally by the chassis of the harvester, and a raised or engaged conformation relative to the portions of the module builder 400 as supported in generally by the chassis of the harvester. Although any mechanical, electromechanical, and/or hydraulic/mechanical system may be used to move the wrap floor assembly 410 between the lowered or disengaged conformation and the raised or engaged conformation relative to portions of the module builder 400.

Figure 12:
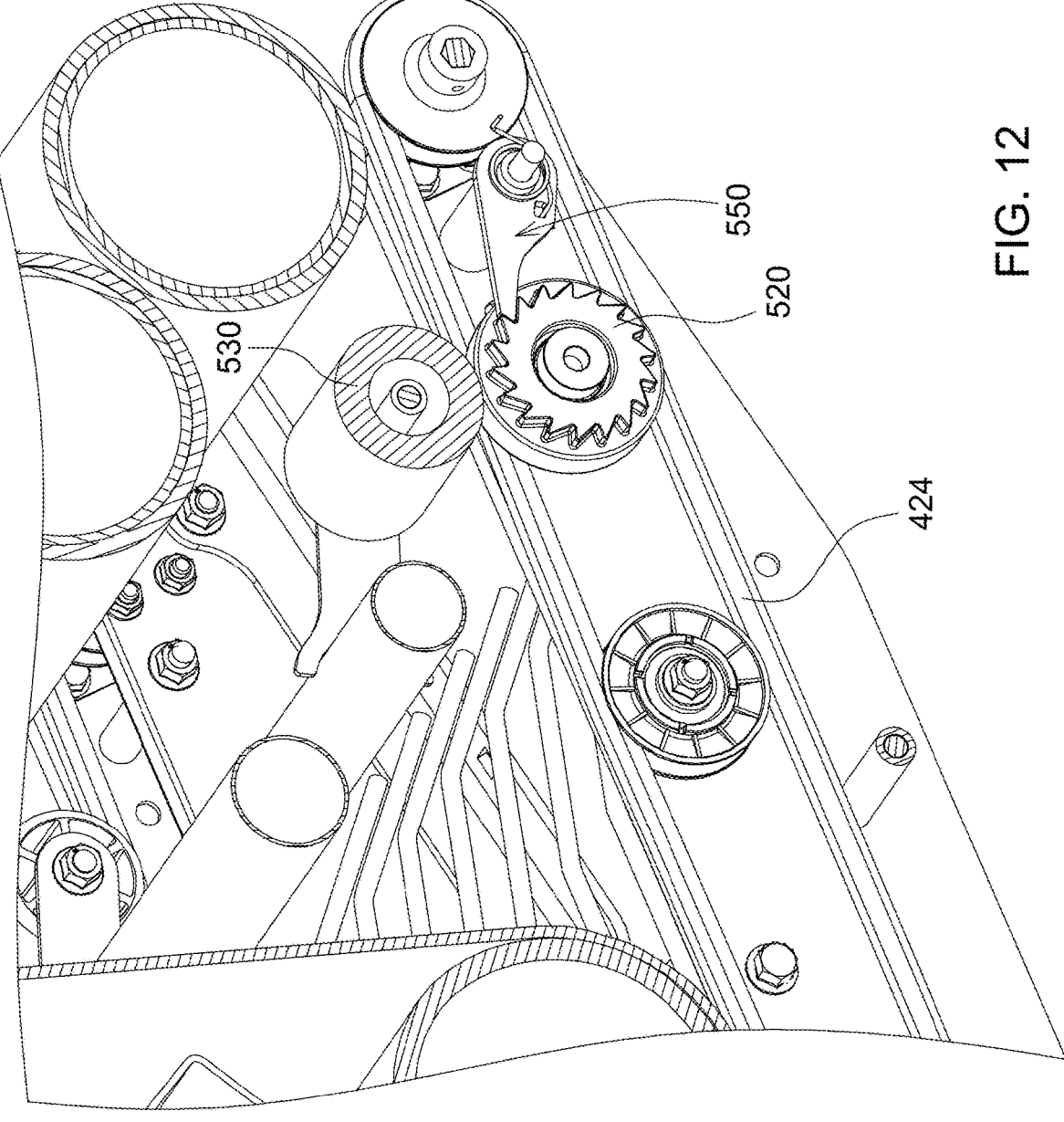
FIG. 12 is an enlarged partial cross-sectional oblique view of a portion of the round module builder 400 shown in FIG. 11 showing a nonhomogeneous nip system in accordance with the further example implementation.
Figure 13:
FIG. 13 is an enlarged partial cross-sectional oblique rear view of a portion of the round module builder 400 shown in FIGS. 9-12 in accordance with the further example implementation.

FIG. 12 is an enlarged partial cross-sectional oblique view of a portion of the round module builder 400 shown in FIG. 11 in accordance with the further example implementation. FIG. 13 is an enlarged partial cross-sectional oblique rear view of a portion of the round module builder 400 shown in FIGS. 9-12 in accordance with the further example implementation. These Figures show a nip system 500 in accordance with a further example implementation.

The nip system 500 in general includes a plurality of wrap frame roller members 520, and a plurality of chassis roller members 530. In the implementation illustrated, the plurality of wrap frame roller members 520 are connected with the frame structure 572 of the associated wrap floor assembly 420. In that way, the plurality of wrap frame roller members 520 are movable together with the associated wrap floor assembly 420 between a lowered position relative to the chassis of the associated harvester 10, and the raised position relative to the chassis of the associated harvester 10.

In the implementation illustrated, the plurality of wrap frame roller members 520 are unidirectionally rotatably connected with the frame structure of the associated wrap floor assembly. In the example implementation, the plurality of wrap frame roller members 520 are prevented from rotating clockwise as viewed in FIGS. 11-13. In an example implementation, a ratchet and pawl mechanism 550 may be used. Other equivalent mechanical and/or electromechanical systems may be used as well. In the example implementation, the plurality of wrap frame roller members 520 are freely rotatable counterclockwise as viewed in FIGS. 11-13, and are preferably carried on low friction bearings or the like to help facilitate the free low frictional rotation. The use of unidirectionally rotatably wrap frame roller members 520 helps to prevent movement of the wrap material backwards through the feed system (away from the chamber inlet and towards the wrapping assembly). Conditions such as wind may otherwise cause the undesirable backwards movement of the wrap material through the feed system, and the unidirectionally rotatably wrap frame roller members 520 helps to prevent this movement.

It is to be appreciated that for the wrap floor assembly 420 disposed in the lowered or disengaged position such as shown in FIGS. 11 and 12, the wrap floor belts 424 are typically stationary and, as such, an undesirable frictional force may be induced in the wrap material as it is drawn into the wrap chamber were the plurality of chassis roller members 530 biased against the wrap floor belts 424 to form the nip for holding the wrap material for the wrap floor assembly 420 disposed in the lowered or disengaged position. Some types of wrap material may be more sensitive to these frictional forces. In the case of pre-partitioned lengths of wrap material that may be interleaved together at lapped joints, it is possible that these frictional forces may be enough tensile force necessary for prematurely separating the joint and possibly causing misfeeds, wasted product, or the like. However, in accordance with the example implementations herein, the nip that is formed for the wrap floor assembly 420 disposed in the lowered or disengaged position is between the plurality of chassis roller members 530 and the wrap frame roller members 520 that are prevented from rotating clockwise but are freely rotatable counterclockwise as viewed in FIGS. 11-13. Thereby the frictional forces are well below the tensile force necessary for prematurely separating the joint and possibly causing misfeeds, wasted product, or the like.

The nonhomogeneous nips in accordance with an example implementation can be accomplished by proper section of the lateral spacing between the plurality of wrap frame roller members 520 and the plurality of chassis roller members 530. That is, the plurality of wrap frame roller members 520 and the plurality of chassis roller members 530 may be spaced apart by selected distances substantially in the horizontal direction as viewed in FIGS. 11-13 in order to realize nonhomogeneous nips in accordance with an example implementation. For the nonhomogeneous nips in accordance with an example implementation, a first nip is formed between the plurality of chassis roller members 530 and the plurality of wrap frame roller members 520 for the associated wrap floor assembly 420 being disposed in the lowered position relative to the chassis, and a second nip is formed between the plurality of chassis roller members 530 and associated wrap floor belts 424 of the associated wrap floor assembly 420 for the associated wrap floor assembly 420 being disposed in the raised position relative to the chassis.

The persistent nonhomogeneous nips in accordance with an example implementation can be accomplished by proper section of the lateral spacing between the plurality of wrap frame roller members 520 and the plurality of chassis roller members 530. That is, the plurality of wrap frame roller members 520 and the plurality of chassis roller members 530 may be spaced apart by selected distances substantially in the horizontal direction as viewed in FIGS. 11-13 in order to realize persistent nonhomogeneous nips in accordance with an example implementation. For the persistent nonhomogeneous nips in accordance with an example implementation, a first nip is formed between the plurality of chassis roller members 530 and the plurality of wrap frame roller members 520 for the associated wrap floor assembly 420 being disposed in the lowered position relative to the chassis, a second nip is formed between the plurality of chassis roller members 530 and associated wrap floor belts 424 of the associated wrap floor assembly 420 for the associated wrap floor assembly 420 being disposed in the raised position relative to the chassis, and a third nip is formed between the plurality of chassis roller members 530 and a combination of the plurality of wrap frame roller members 520 and the associated wrap floor belts 424 for the associated wrap floor assembly 420 being disposed at a transition conformation between the lowered and raised positions relative to the chassis of the associated harvester.

Figure 14:
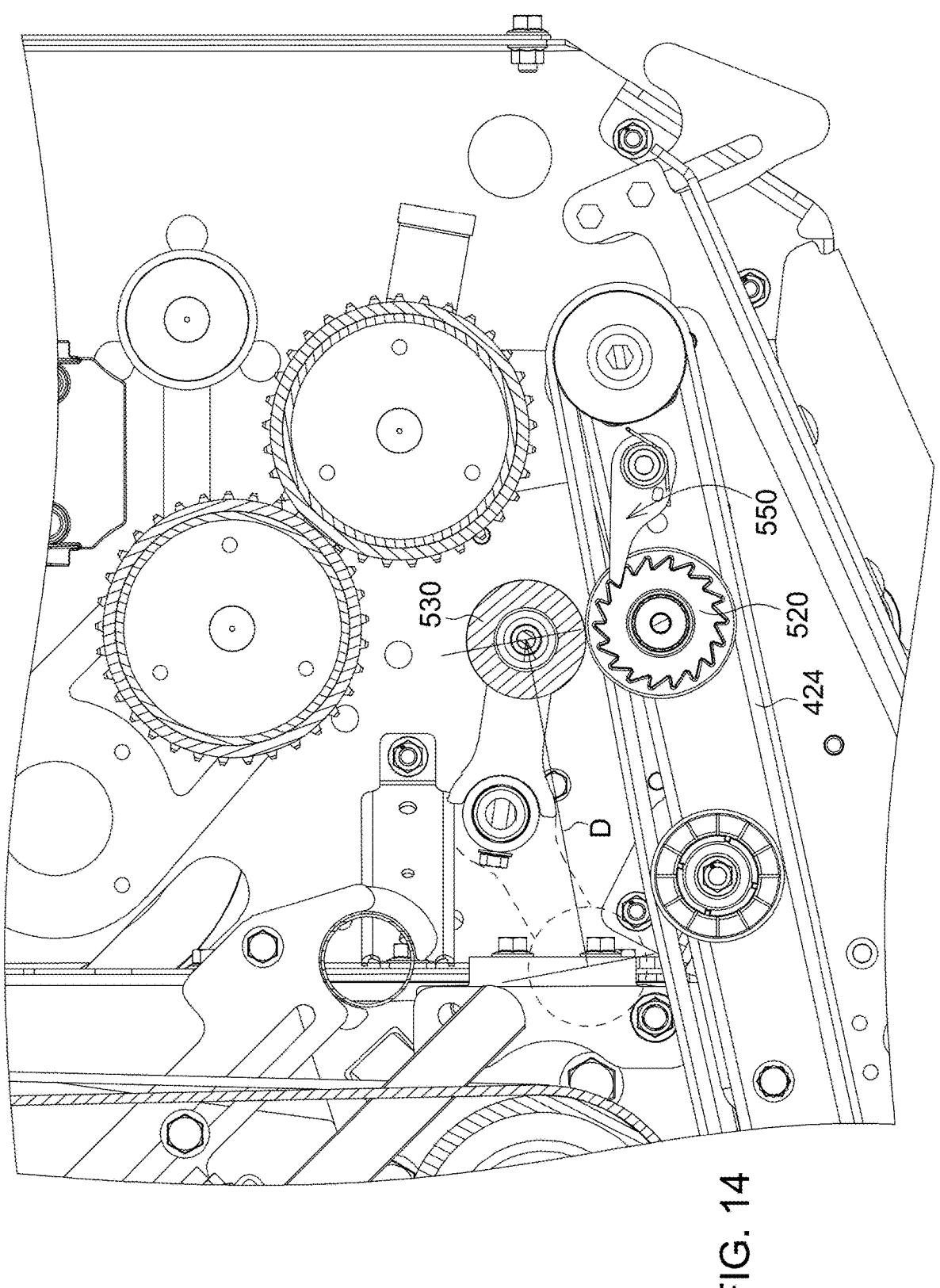
FIG. 14 is a side elevational view of a biasing portion of the nonhomogeneous nip system in accordance with an example implementation.

FIG. 14 is a side elevational view of a biasing portion of the nonhomogeneous nip system in accordance with an example implementation. With reference to that Figure and with continued reference to FIGS. 6, 7, 11, and 12 and the plurality of chassis roller members 330, 530 are carried on arm members 340, 540 that extend from a common support shaft. The arm members 340, 540 are directed rearwardly relative to the module builder and, thereby, the plurality of chassis roller members 330, 530 are disposed closer to the rear of the module builder by a distance D than they would be where the arm members 340, 540 are directed rearwardly relative to the module builder. This makes threading new lead ends of the wrap material into the nip by an operator working at the rear of the harvester much more efficient and easier.

Figure 15:
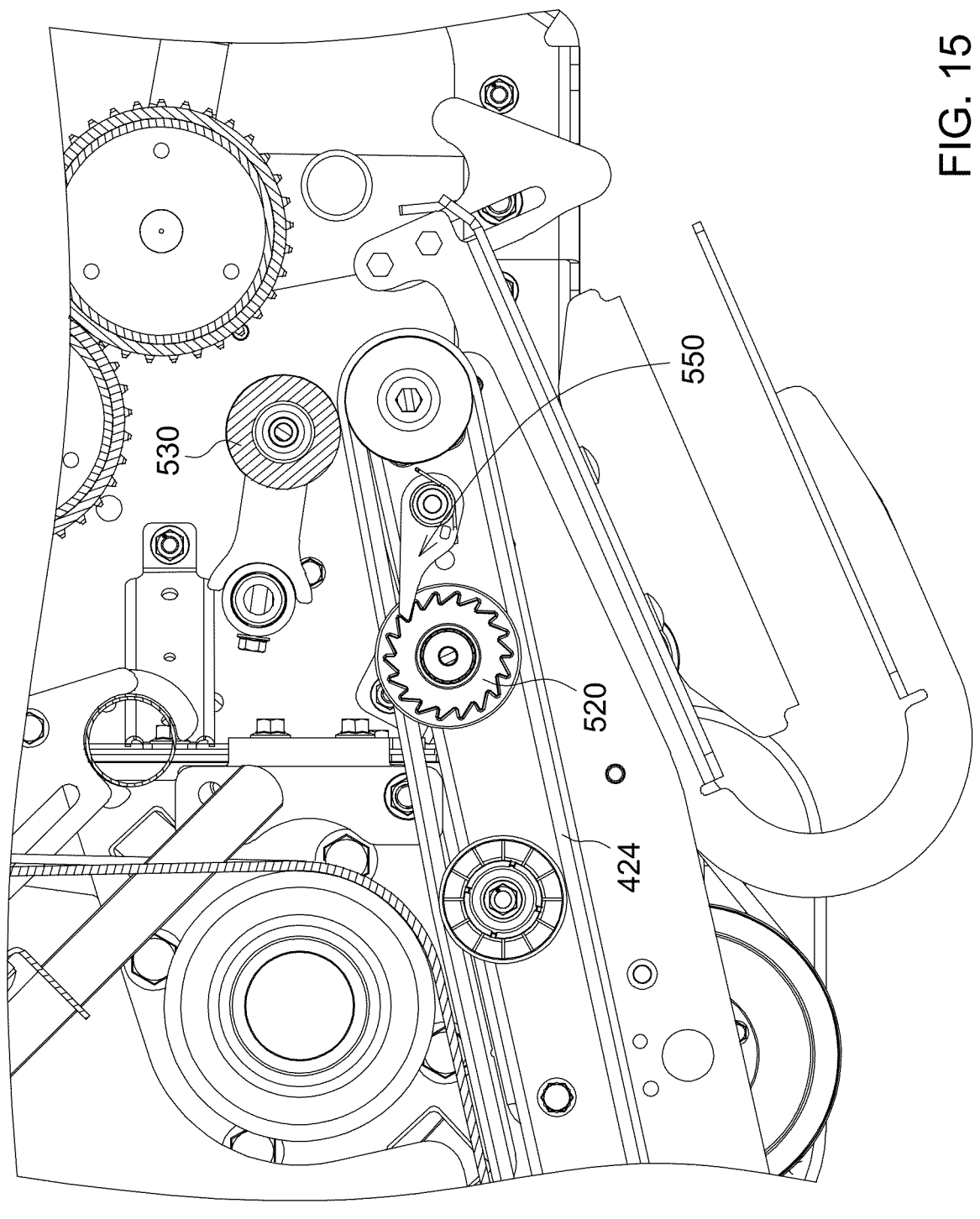
FIG. 15 is an enlarged partial cross-sectional side view of a portion of the round module builder 400 shown in FIGS. 11 and 12 showing a nonhomogeneous nip system in accordance with the further example implementation.

FIG. 15 is an enlarged partial cross-sectional side view of a portion of the round module builder 400 shown in FIGS. 11 and 12 in accordance with the further example implementation. It is to be appreciated that the showing in FIG. 12 illustrates the nip system of the example implementation for the wrap floor assembly 160 of the associated harvester disposed in the lowered or disengaged position, and that the showing in FIG. 15 illustrates the nip system of the example implementation for the wrap floor assembly 160 of the associated harvester disposed in the raised or engaged position.

It is further to be appreciated that, in FIG. 12 for the wrap floor assembly 160 of the associated harvester disposed in the lowered or disengaged position, a nip is created between the wrap frame roller members 520 and the chassis roller members 530, wherein the associated wrap material may be held by the nip, and wherein the nip permits free movement of the wrap material into the harvester towards the module builder 400 (to the left as viewed in FIG. 12) and prevents movement of the wrap material out of the nip away from the module builder (to the right as viewed in FIG. 12). This helps to minimize misfeeds of the wrap material, wasted time, wasted product, and the like.

It is still further to be appreciated that, in FIG. 15 for the wrap floor assembly 160 of the associated harvester disposed in the raised or engaged position, a nip is created between the chassis roller members 530 and the wrap floor belts 424, wherein the associated wrap material may be held by the nip, and wherein the nip helps to feed the wrap material into the harvester towards the module builder 400 (to the left as viewed in FIG. 15) by the interaction between the moving wrap floor belts 424 and the wrap material held in the nip formed with the chassis roller members 530.

It is yet still further to be appreciated and observed by comparing the differences in relative positions of the various mechanisms that the wrap floor assembly 160 when moved from the first position as illustrated in FIG. 12 (lowered) to the second position as illustrated in FIG. 15 (raised) moves both vertically (upwardly as viewed in FIGS. 12 and 15) and forwardly (to the left as viewed in FIGS. 12 and 15) relative to the module builder 80 as supported in generally by the chassis 20. In this second position, a first nip is created or otherwise formed between the chassis roller members 530 and the wrap floor belts 424. It is further to be appreciated and observed by comparing the differences in relative positions of the various mechanisms that the wrap floor assembly 160 when moved from the second position as illustrated in FIG. 15 (raised) to the first position as illustrated in FIG. 12 (lowered) moves both downwardly and rearwardly (to the right as viewed in FIGS. 12 and 15) relative to the module builder 80 as supported in generally by the chassis 20. In this first position, a second nip is created or otherwise formed between the wrap frame roller members 520 and the chassis roller members 530 The nip system of the example implementation is therefore nonhomogeneous as being formed by different components.

Figure 16:
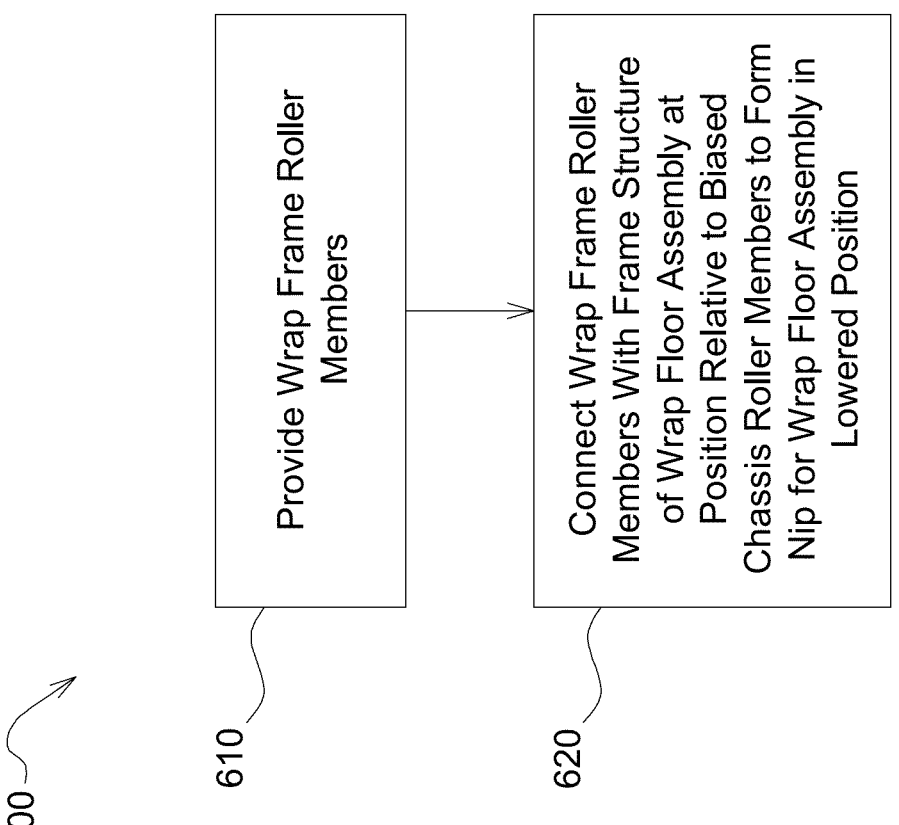
FIG. 16 is a flow diagram illustrating a method of retrofitting a nip system to provide a persistent nonhomogeneous nip system in an associated wrap floor assembly in accordance with an example implementation.

FIG. 16 is a flow diagram illustrating a method 600 of retrofitting a nip system to provide a nonhomogeneous nip system in an associated wrap floor assembly in accordance with an example implementation. With reference now to that Figure, the method 600 provides a nonhomogeneous nip system in an associated wrap floor assembly that is movable between lowered and raised positions relative to a chassis supporting a module builder of an associated harvester. In accordance with the method 600 of the example implementation, a plurality of wrap frame roller members are provided at 610. In addition, and at 620, the plurality of wrap frame roller members are connected with a frame structure of the associated wrap floor assembly, wherein the plurality of wrap frame roller members are movable together with the associated wrap floor assembly between the lowered and raised positions relative to the chassis of the associated harvester. In accordance with the method, the plurality of wrap frame roller members are connected with the frame structure at a position relative to a plurality of chassis roller members biased relative to the chassis of the associated harvester towards the associated wrap floor assembly to cause a nip to thereby be formed between the plurality of chassis roller members and the plurality of wrap frame roller members for the associated wrap floor assembly being disposed in the lowered position relative to the chassis.

In any of the implementations herein, and at 620, the plurality of wrap frame roller members are connected with the frame structure of the associated wrap floor assembly at a position relative to the plurality of chassis roller members biased relative to the chassis of the associated harvester towards the associated wrap floor assembly to cause non-homogeneous nips to thereby be formed between the plurality of chassis roller members and the plurality of wrap frame roller members for the associated wrap floor assembly being disposed in the lowered position relative to the chassis, and between the plurality of chassis roller members and associated wrap floor belts of the associated wrap floor assembly for the associated wrap floor assembly being disposed in the raised position relative to the chassis of the associated harvester.

In any of the implementations herein, and at 620, the plurality of wrap frame roller members are connected with the frame structure at a position relative to a plurality of chassis roller members biased relative to the chassis of the associated harvester towards the associated wrap floor assembly to cause nonhomogeneous nips to thereby be formed: between the plurality of chassis roller members and the plurality of wrap frame roller members for the associated wrap floor assembly being disposed in the lowered position relative to the chassis, between the plurality of chassis roller members and associated wrap floor belts of the associated wrap floor assembly for the associated wrap floor assembly being disposed in the raised position relative to the chassis, and between the plurality of chassis roller members and a combination of the plurality of wrap frame roller members and the associated wrap floor belts for the associated wrap floor assembly being disposed at a transition conformation between the lowered and raised positions relative to the chassis of the associated harvester.

In any of the implementations herein, the providing the plurality of wrap frame roller members includes obtaining the plurality of wrap frame roller members from an associated source of wrap frame roller members.

In any of the implementations herein, the obtaining the plurality of wrap frame roller members from the associated source of wrap frame roller members includes obtaining a plurality of unidirectionally rotatably wrap frame roller members from the associated source of wrap frame roller members.

In any of the implementations herein, the providing the plurality of wrap frame roller members includes providing the plurality of wrap frame roller members to an associated end user of the associated harvester for the associated end user to connect the plurality of wrap frame roller members with the frame structure of the associated wrap floor assembly at the position relative to a plurality of chassis roller members to cause the nip to thereby be formed.

In any of the implementations herein, the providing the plurality of wrap frame roller members to the associated end user of the associated harvester includes providing a plurality of unidirectionally rotatably wrap frame roller members to the associated end user of the associated harvester for the associated end user to connect the plurality of unidirectionally rotatably wrap frame roller members with the frame structure of the associated wrap floor assembly at the position relative to a plurality of chassis roller members to cause the nip to thereby be formed.

Without in any way limiting the scope, interpretation, or application of the claims appearing below, a technical effect of one or more of the example implementations disclosed herein is using smart speed control to allow the vehicle to operate at maximum speeds instead of using a blanket worst case speed restriction to prohibitively restrict speeds even when the track temperature is not problematic. Another technical effect of one or more of the example implementations disclosed herein is a sensing and warning system for track misalignment.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application.

As used herein, "e.g." is utilized to non-exhaustively list examples, and carries the same meaning as alternative illustrative phrases such as "including," "including, but not limited to," and "including without limitation."

As used herein, unless otherwise limited or modified, lists with elements that are separated by conjunctive terms (e.g., "and") and that are also preceded by the phrase "one or more of," "at least one of," "at least," or a like phrase, indicate configurations or arrangements that potentially include individual elements of the list, or any combination thereof. For example, "at least one of A, B, and C" and "one or more of A, B, and C" each indicate the possibility of only A, only B, only C, or any combination of two or more of A, B, and C (A and B; A and C; B and C; or A, B, and C).

As used herein, the singular forms "a", "an" and "the" are intended to include the plural forms as well, unless the context clearly indicates otherwise. Furthermore, to the extent that the terms "includes," "having," "has," "with," or variants thereof are used in either the detailed description or the claims, such terms are intended to specify the presence of stated features, steps, operations, elements, and/or components, but do not preclude the presence or addition of one or more other features, steps, operations, elements, components, and/or groups thereof, and are intended to be inclusive in a manner similar to the term "comprising."

For the sake of brevity, conventional techniques and arrangements related to signal processing, data transmission, signaling, control, and other aspects of the systems disclosed herein may not be described in detail. Furthermore, the connecting lines shown in the various figures contained herein are intended to represent example relationships and/ or connections between the various elements (e.g., electrical power connections, communications, and physical couplings). It should be noted that many alternative or additional relationships or connections may be present in an implementation of the present disclosure.

While the present disclosure has been illustrated and described in detail in the drawings and foregoing description, such illustration and description is not restrictive in character, it being understood that illustrative implementation(s) have been shown and described and that all changes and modifications that come within the spirit of the present disclosure are desired to be protected. Alternative implementations of the present disclosure may not include all of the features described yet still benefit from at least some of the advantages of such features. Those of ordinary skill in the art may devise their own implementations that incorporate one or more of the features of the present disclosure and fall within the spirit and scope of the appended claims.

The implementations have been described, hereinabove. It will be apparent to those skilled in the art that the above methods and apparatuses may incorporate changes and modifications without departing from the general scope of this invention. It is intended to include all such modifications and alterations in so far as they come within the scope of the appended claims or the equivalents thereof.

The invention claimed is:

1. A nip system for use with an associated wrap floor assembly that is movable between lowered and raised positions relative to a chassis supporting a module builder of an associated harvester, the nip system comprising:
   a plurality of wrap frame roller members connected with a frame structure of the associated wrap floor assembly, wherein the plurality of wrap frame roller members are movable together with the associated wrap floor assembly between the lowered and raised positions relative to the chassis of the associated harvester; and
   a plurality of chassis roller members biased relative to the chassis of the associated harvester towards the associated wrap floor assembly,
   wherein the plurality of wrap frame roller members are connected with the frame structure at a position relative to the plurality of chassis roller members causing nips to be formed:
      between the plurality of chassis roller members and the plurality of wrap frame roller members for the associated wrap floor assembly being disposed in the lowered position relative to the chassis; and
      between the plurality of chassis roller members and associated wrap floor belts of the associated wrap floor assembly for the associated wrap floor assembly being disposed in the raised position relative to the chassis.

2. The nip system according to claim 1, wherein:
   the plurality of wrap frame roller members are unidirectionally rotatably connected with the frame structure of the associated wrap floor assembly.

3. The nip system according to claim 1, wherein:
   the plurality of wrap frame roller members are connected with the frame structure of the associated wrap floor assembly at a position selected to provide a lateral spacing between the plurality of wrap frame roller members and the plurality of chassis roller members causing the nips to be formed:
      between the plurality of chassis roller members and the plurality of wrap frame roller members for the associated wrap floor assembly being disposed in the lowered position relative to the chassis; and
      between the plurality of chassis roller members and the associated wrap floor belts of the associated wrap floor assembly for the associated wrap floor assembly being disposed in the raised position relative to the chassis,
   wherein the frame structure of the associated wrap floor assembly moves laterally relative to the chassis of the associated harvester for movement of the frame structure between the raised and lowered positions.

4. The nip system according to claim 1, wherein:
   the plurality of wrap frame roller members are connected with the frame structure at a position relative to the plurality of chassis roller members causing a nip to be formed:
   between the plurality of chassis roller members and a combination of the plurality of wrap frame roller members and associated wrap floor belts of the associated wrap floor assembly for the associated wrap floor assembly being disposed at a transition conformation between the lowered and raised positions relative to the chassis of the associated harvester.

5. The nip system according to claim 4, wherein:
   the plurality of wrap frame roller members are unidirectionally rotatably connected with the frame structure of the associated wrap floor assembly.

6. The nip system according to claim 1, wherein:
   the plurality of wrap frame roller members are connected with the frame structure at a position relative to the plurality of chassis roller members causing a nip to be formed:
   between the plurality of chassis roller members and a combination of the plurality of wrap frame roller members and associated wrap floor belts of the associated wrap floor assembly for the associated wrap floor assembly being disposed at a transition conformation between the lowered and raised positions relative to the chassis of the associated harvester.

7. The nip system according to claim 6, wherein:
   the plurality of wrap frame roller members are unidirectionally rotatably connected with the frame structure of the associated wrap floor assembly.

8. A persistent nip system for use with an associated wrap floor assembly that is movable between lowered and raised positions relative to a chassis supporting a module builder of an associated harvester, the nip system comprising:
   a plurality of wrap frame roller members connected with a frame structure of the associated wrap floor assembly, wherein the plurality of wrap frame roller members are movable together with the associated wrap floor assembly between the lowered and raised positions relative to the chassis of the associated harvester; and
   a plurality of chassis roller members biased relative to the chassis of the associated harvester towards the associated wrap floor assembly,
   wherein the plurality of wrap frame roller members are connected with the frame structure at a position relative to the plurality of chassis roller members causing persistent nips to be formed:

between the plurality of chassis roller members and the plurality of wrap frame roller members for the associated wrap floor assembly being disposed in the lowered position relative to the chassis;

between the plurality of chassis roller members and associated wrap floor belts of the associated wrap floor assembly for the associated wrap floor assembly being disposed in the raised position relative to the chassis; and between the plurality of chassis roller members and a combination of the plurality of wrap frame roller members and the associated wrap floor belts for the associated wrap floor assembly being disposed at a transition conformation between the lowered and raised positions relative to the chassis of the associated harvester.

9. The nip system according to claim 8, wherein:

the plurality of wrap frame roller members are unidirectionally rotatably connected with the frame structure of the associated wrap floor assembly.

10. A method of retrofitting an associated harvester having wrap floor assembly that is movable between lowered and raised positions relative to a chassis supporting a module builder to provide a nip system in the associated harvester, the method comprising:

providing a plurality of wrap frame roller members; and connecting the plurality of wrap frame roller members with a frame structure of the associated wrap floor assembly to be movable together with the associated wrap floor assembly and at a position relative to a plurality of chassis roller members biased relative to the chassis of the associated harvester towards the associated wrap floor assembly to cause nips to thereby be formed:

between the plurality of chassis roller members and the plurality of wrap frame roller members for the associated wrap floor assembly being disposed in the lowered position relative to the chassis; and between the plurality of chassis roller members and associated wrap floor belts of the associated wrap floor assembly for the associated wrap floor assembly being disposed in the raised position relative to the chassis.

11. The method according to claim 10, wherein the providing the plurality of wrap frame roller members comprises:

providing a plurality of unidirectionally rotatably wrap frame roller members; and connecting the plurality of unidirectionally rotatably wrap frame roller members with the frame structure of the associated wrap floor assembly.

12. The method according to claim 10, further comprising:

connecting the plurality of wrap frame roller members with the frame structure of the associated wrap floor assembly to be movable together with the associated wrap floor assembly and at a position selected to provide a lateral spacing between the plurality of wrap frame roller members and the plurality of chassis roller members biased relative to the chassis of the associated harvester towards the associated wrap floor assembly to cause the nips to thereby be formed:

between the plurality of chassis roller members and the plurality of wrap frame roller members for the associated wrap floor assembly being disposed in the lowered position relative to the chassis; and between the plurality of chassis roller members and associated wrap floor belts of the associated wrap floor assembly for the associated wrap floor assembly being disposed in the raised position relative to the chassis, wherein the frame structure of the associated wrap floor assembly moves laterally relative to the chassis of the associated harvester for movement of the frame structure between the raised and lowered positions.

13. The method according to claim 12, further comprising:

connecting the plurality of wrap frame roller members with the frame structure of the associated wrap floor assembly to be movable together with the associated wrap floor assembly and at a position relative to a plurality of chassis roller members biased relative to the chassis of the associated harvester towards the associated wrap floor assembly to cause the nips to thereby be formed:

between the plurality of chassis roller members and the plurality of wrap frame roller members for the associated wrap floor assembly being disposed in the lowered position relative to the chassis;

between the plurality of chassis roller members and associated wrap floor belts of the associated wrap floor assembly for the associated wrap floor assembly being disposed in the raised position relative to the chassis; and between the plurality of chassis roller members and a combination of the plurality of wrap frame roller members and the associated wrap floor belts for the associated wrap floor assembly being disposed at a transition conformation between the lowered and raised positions relative to the chassis of the associated harvester.

14. The method according to claim 12, wherein the providing the plurality of wrap frame roller members comprises:

providing a plurality of unidirectionally rotatably wrap frame roller members; and connecting the plurality of unidirectionally rotatably wrap frame roller members with the frame structure of the associated wrap floor assembly.

15. The method according to claim 10, further comprising:

connecting the plurality of wrap frame roller members with the frame structure of the associated wrap floor assembly to be movable together with the associated wrap floor assembly and at a position relative to a plurality of chassis roller members biased relative to the chassis of the associated harvester towards the associated wrap floor assembly to cause the nips to thereby be formed:

between the plurality of chassis roller members and the plurality of wrap frame roller members for the associated wrap floor assembly being disposed in the lowered position relative to the chassis;

between the plurality of chassis roller members and associated wrap floor belts of the associated wrap floor assembly for the associated wrap floor assembly being disposed in the raised position relative to the chassis; and between the plurality of chassis roller members and a combination of the plurality of wrap frame roller members and the associated wrap floor belts for the associated wrap floor assembly being disposed at a transition conformation between the lowered and raised positions relative to the chassis of the associated harvester.

16. The method according to claim 15, wherein the providing the plurality of wrap frame roller members comprises:

providing a plurality of unidirectionally rotatably wrap frame roller members; and connecting the plurality of unidirectionally rotatably wrap frame roller members with the frame structure of the associated wrap floor assembly.

17. The method according to claim 10, wherein the providing the plurality of wrap frame roller members comprises:

obtaining the plurality of wrap frame roller members from a source of wrap frame roller members.

18. The method according to claim 17, wherein the obtaining the plurality of wrap frame roller members from the source of wrap frame roller members comprises:

obtaining a plurality of unidirectionally rotatably wrap frame roller members from the source of wrap frame roller members.

19. The method according to claim 10, wherein the providing the plurality of wrap frame roller members comprises:

providing the plurality of wrap frame roller members to an end user of the associated harvester for the end user to connect the plurality of wrap frame roller members with the frame structure of the associated wrap floor assembly at the position relative to a plurality of chassis roller members to cause the nips to thereby be formed.

20. The method according to claim 19, wherein the providing the plurality of wrap frame roller members to the end user of the associated harvester comprises:

providing a plurality of unidirectionally rotatably wrap frame roller members to the end user of the associated harvester for the end user to connect the plurality of unidirectionally rotatably wrap frame roller members with the frame structure of the associated wrap floor assembly at the position relative to a plurality of chassis roller members to cause the nips to thereby be formed.

* * * * *